US012648020B2

(12) United States Patent
Singh et al.

(10) Patent No.: US 12,648,020 B2
(45) Date of Patent: Jun. 2, 2026

(54) RADIO COMMUNICATION TECHNIQUE FOR HANDLING IDLE TIMES

(71) Applicant: Telefonaktiebolaget LM Ericsson (publ), Stockholm (SE)

(72) Inventors: Bikramjit Singh, Raasepori (FI); Torsten Dudda, Wassenberg (DE); Reem Karaki, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 522 days.

(21) Appl. No.: 18/018,940

(22) PCT Filed: Jul. 30, 2021

(86) PCT No.: PCT/SE2021/050763
§ 371 (c)(1),
(2) Date: Jan. 31, 2023

(87) PCT Pub. No.: WO2022/025817
PCT Pub. Date: Feb. 3, 2022

(65) Prior Publication Data
US 2023/0284273 A1 Sep. 7, 2023

Related U.S. Application Data

(60) Provisional application No. 63/059,857, filed on Jul. 31, 2020.

(51) Int. Cl.
*H04W 74/0816* (2024.01)
*H04W 24/08* (2009.01)

(52) U.S. Cl.
CPC ....... *H04W 74/0816* (2013.01); *H04W 24/08* (2013.01)

(58) Field of Classification Search
CPC . H04W 74/0816; H04W 72/23; H04W 24/10; H04W 24/08; H04W 24/02; H04W 72/0446; H04W 16/14
See application file for complete search history.

(56) References Cited

U.S. PATENT DOCUMENTS 11,696,284 B2 * 7/2023 Liu ........................ H04L 1/1893
370/329
12,160,889 B2 * 12/2024 Jiang ................. H04W 72/0446
(Continued)

FOREIGN PATENT DOCUMENTS

WO 2020027533 A1 2/2020

OTHER PUBLICATIONS

European Terecommunications Standards Institute, "5 GHz RLAN; Harmonised Standard covering the essential requirements of article 3.2 of Directive 2014/53/EU", Harmonised European Standard, ETSI EN 301 893 V2.1.38, Jun. 2020, pp. 1-163, ETSI.
(Continued)

*Primary Examiner* — Mong-Thuy T Tran
(74) *Attorney, Agent, or Firm* — COATS & BENNETT, PLLC

(57) ABSTRACT

A technique for using radio resources in fixed frame periods, FFPs, (500) on a channel for radio communication in a radio network comprising a first node (100) and a second node (200) is described. Each of the FFPs (500) comprises an idle time, IT, (502) for clear channel assessment, CCA, (506) of the channel and a maximum channel occupancy time, M-COT, (504) for occupying the channel depending on the CCA (506). As to a method aspect of the technique performed by the first node (100), a method (300) comprises the step of selectively monitoring (302) the radio resources in the FFPs (500) on the channel. The selective monitoring (302) comprises refraining from monitoring a first set (602) of the radio resources, which is allocated to a first message
(Continued)

300

Selectively monitoring radio resources in FFPs on a channel, wherein the selective monitoring comprises refraining from monitoring a first set of the radio resources, which is allocated to a first message of a second node and which is partially or completely in an IT (e.g., of a second FFP used by the second node) ⌐⌐⌐ 302

Selectively transmitting on radio resources in FFPs on a channel, wherein the selective transmitting comprises refraining from transmitting on a first set of the radio resources, which is allocated to a first message of a first node and which is partially or completely in an IT (e.g., of a first FFP used by the first node) ⌐⌐⌐ 304 of the second node (200) and which is partially or completely in the IT (502). Alternatively or in addition, the method (300) comprises the step of selectively transmitting (304) on the radio resources in the FFPs (500) on the channel. The selective transmitting (304) comprises refraining from transmitting on a first set (602) of the radio resources, which is allocated to a first message of the first node (100) and which is partially or completely in the IT (502).

22 Claims, 18 Drawing Sheets

(56) References Cited

U.S. PATENT DOCUMENTS

| | | | |
|---|---|---|---|
| 2019/0394790 A1* | 12/2019 | Damnjanovic ... | H04W 72/0446 |
| 2020/0084759 A1 | 3/2020 | Liu et al. | |
| 2020/0162938 A1 | 5/2020 | Ansari et al. | |
| 2021/0243808 A1* | 8/2021 | Deenoo ............... | H04W 74/002 |
| 2021/0298074 A1* | 9/2021 | Park ..................... | H04B 17/336 |
| 2021/0368541 A1* | 11/2021 | Hedayat ............ | H04W 74/0816 |
| 2021/0385824 A1* | 12/2021 | Damnjanovic ..... | H04W 74/085 |
| 2022/0061086 A1* | 2/2022 | Xue .................. | H04W 72/0446 |
| 2022/0322401 A1* | 10/2022 | He ........................ | H04W 72/20 |
| 2023/0055275 A1* | 2/2023 | Xu .................... | H04W 74/0866 |
| 2023/0199833 A1* | 6/2023 | Xu .................... | H04W 72/0446 |
| | | | 370/329 |
| 2024/0098781 A1* | 3/2024 | Tsai .................. | H04W 74/0808 |

OTHER PUBLICATIONS

IEEE Standards Association, "IEEE Standard for Information technology—Telecommunications and information exchange between systems Local and metropolitan area networks—Specific requirements; Part 11: Wireless LAN Medium Access Control (MAC) and Physical Layer (PHY) Specifications Amendment 4: Enhancements for Very High Throughput for Operation in Bands below 6 GHz", IEEE Std 802.11ac™-2013, 2013, IEEE Computer Society.

IEEE Standards Association, "IEEE Standard for Low-Rate Wireless Networks", IEEE Std 802.15.4™-2020, 2020, pp. 1-799, IEEE Computer Society.

IEEE Standards Association, "IEEE Standard for Information technology—Telecommunications and information exchange between systems—Local and metropolitan area networks—Specific requirements; Part 11: Wireless LAN Medium Access Control (MAC) and Physical Layer (PHY) specifications Amendment 5: Spectrum and Transmit Power Management Extensions in the 5 GHz band in Europe", IEEE 802.11h, Oct. 14, 2003, pp. 1-75, IEEE Computer Society.

3rd Generation Partnership Project, "3rd Generation Partnership Project; Technical Specification Group Services and System Aspects; Proximity-based Services (ProSe); Security aspects (Release 16)", Technical Specification, 3GPP TS 33.303 V16.0.0, Jul. 2020, pp. 1-90, 3GPP, France.

3rd Generation Partnership Project, "3rd Generation Partnership Project; Technical Specification Group Radio Access Network; NR; Physical layer procedures for control (Release 16)", Technical Specification, 3GPP TS 38.213 V16.2.0, Jun. 2020, pp. 1-176, 3GPP, France.

3rd Generation Partnership Project, "3rd Generation Partnership Project; Technical Specification Group Radio Access Network; NR; Physical layer procedures for data (Release 16)", Technical Specification, 3GPP TS 38.214 V16.2.0, Jun. 2020, pp. 1-163, 3GPP, France.

Qualcomm, Inc., "Revised WID on NR-based Access to Unlicensed Spectrum", 3GPP TSG RAN Meeting #83, Shenzhen, China, Mar. 18-21, 2019, pp. 1-8, RP-190706, 3GPP.

3rd Generation Partnership Project, "3rd Generation Partnership Project; Technical Specification Group Services and System Aspects; Proximity-based services (ProSe); Stage 2 (Release 16)", Technical Specification, 3GPP TS 23.303 V16.0.0, Jul. 2020, pp. 1-130, 3GPP.

* cited by examiner

100

200

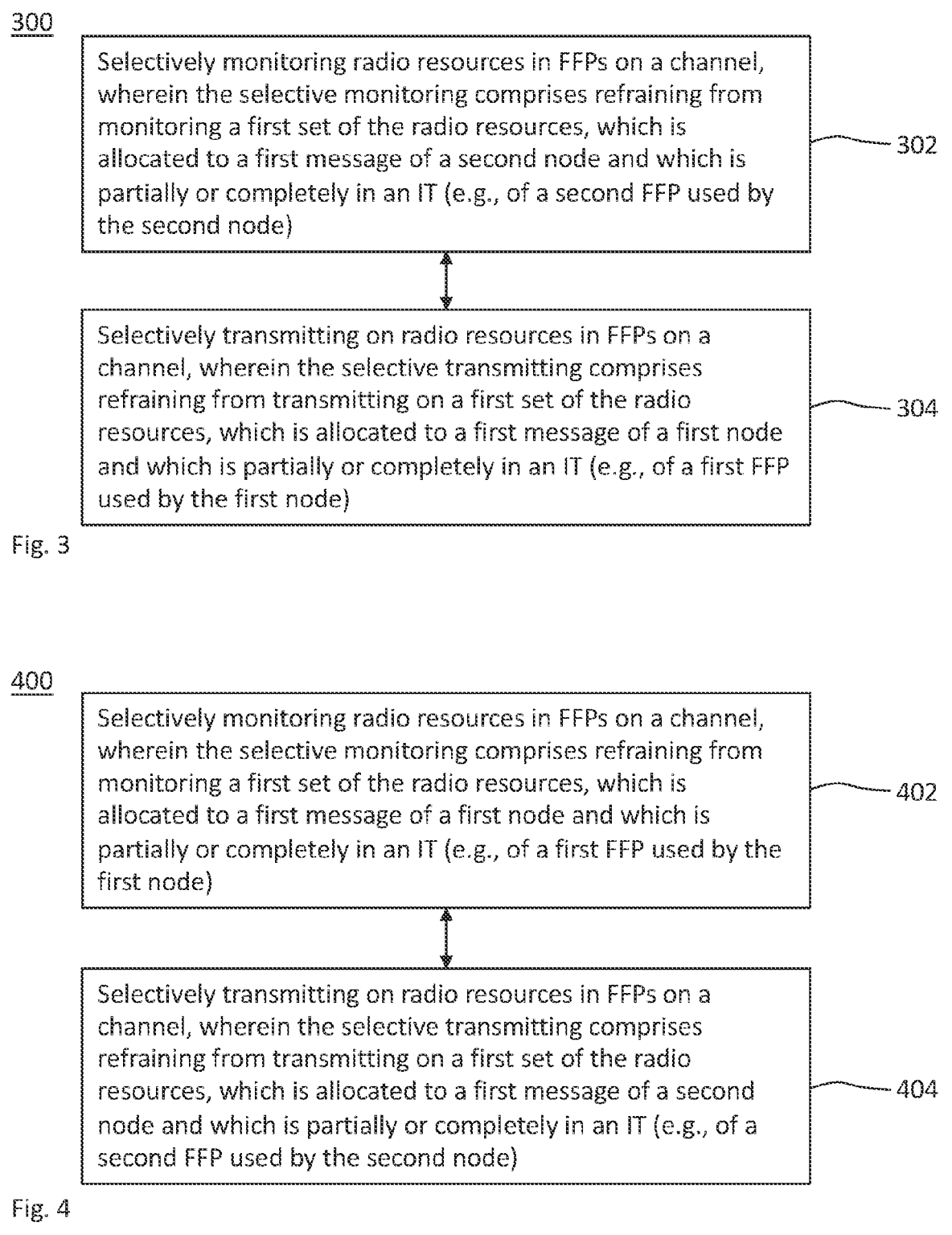

300

Selectively monitoring radio resources in FFPs on a channel, wherein the selective monitoring comprises refraining from monitoring a first set of the radio resources, which is allocated to a first message of a second node and which is partially or completely in an IT (e.g., of a second FFP used by the second node) —— 302

Selectively transmitting on radio resources in FFPs on a channel, wherein the selective transmitting comprises refraining from transmitting on a first set of the radio resources, which is allocated to a first message of a first node and which is partially or completely in an IT (e.g., of a first FFP used by the first node) —— 304

Selectively monitoring radio resources in FFPs on a channel, wherein the selective monitoring comprises refraining from monitoring a first set of the radio resources, which is allocated to a first message of a first node and which is partially or completely in an IT (e.g., of a first FFP used by the first node) —— 402

Selectively transmitting on radio resources in FFPs on a channel, wherein the selective transmitting comprises refraining from transmitting on a first set of the radio resources, which is allocated to a first message of a second node and which is partially or completely in an IT (e.g., of a second FFP used by the second node) —— 404

Fig. 4

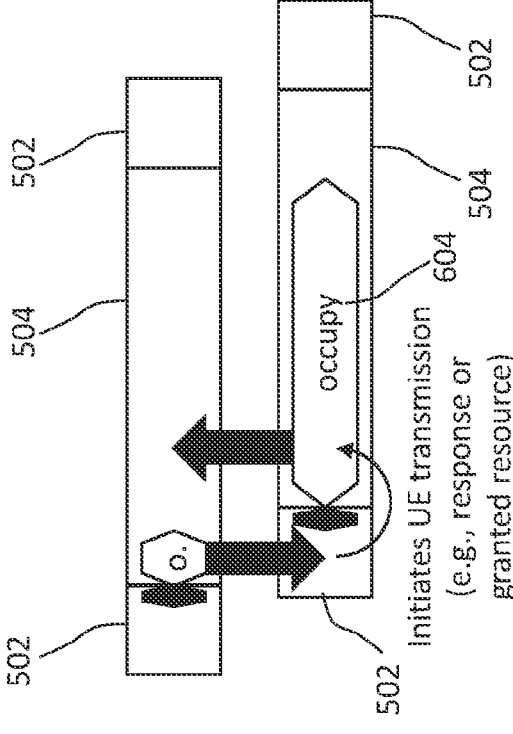
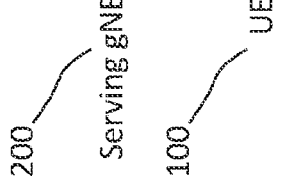
Fig. 10

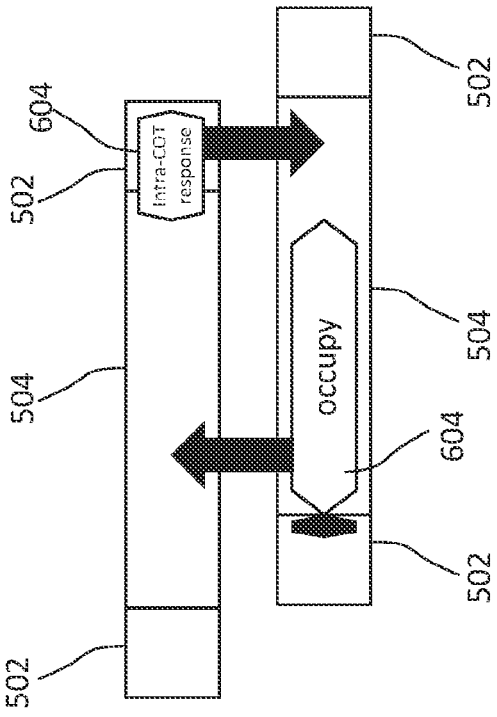
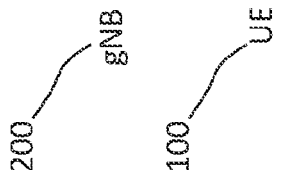
Fig. 11

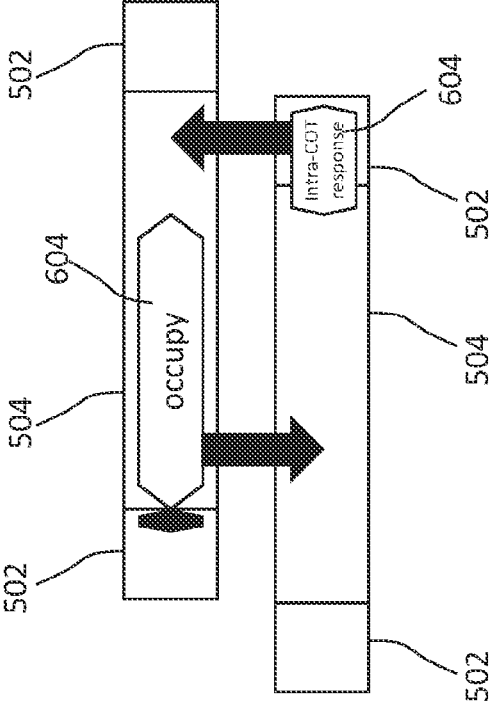
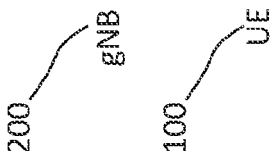
Fig. 12

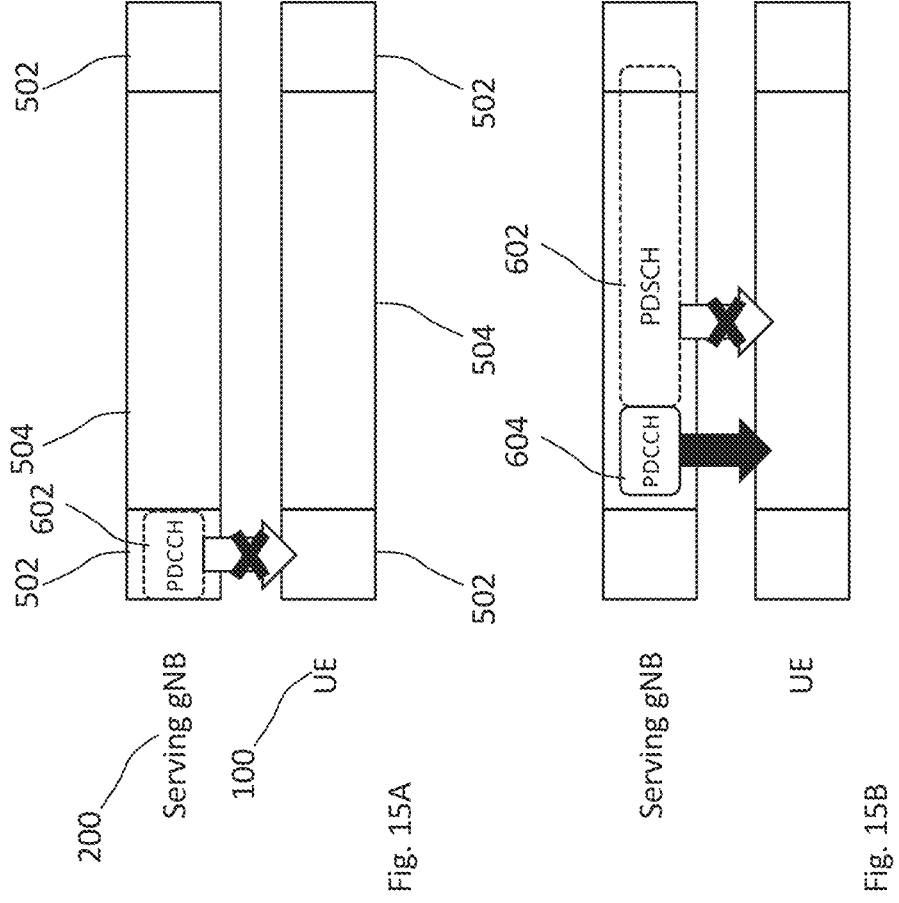

1600

1700

1800

RADIO COMMUNICATION TECHNIQUE FOR HANDLING IDLE TIMES

TECHNICAL FIELD

The present disclosure relates to a radio communication technique for handling idle times. More specifically, and without limitation, methods and devices are provided for using radio resources in fixed frame periods on a channel for radio communication in a radio network comprising a first node and a second node, each of fixed frame periods comprising an idle time.

BACKGROUND

Ultra-reliable and low latency communication (URLLC) is one of the main use cases of 5G new radio (NR) specified by the Third Generation Partnership Group (3GPP). URLLC has strict requirements on transmission reliability and latency, i.e., 99.9999% reliability within 1 ms one-way latency. In 3GPP NR Release 15, several features and enhancements were introduced to support these requirements. In 3GPP Release 16, standardization works are focused on further enhancing URLLC system performance as well as ensuring reliable and efficient coexistence of URLLC and other NR use cases. One example scenario is when radio devices (e.g., user equipments, UEs) for both enhanced mobile broadband (eMBB) and URLLC co-exist in the same cell. Here, mainly two approaches have been identified to support multiplexing and/or prioritization.

In addition to operation in licensed bands, NR has been enhanced in 3GPP Release 16 (e.g., according to the 3GPP document RP-190706, Revised WID on NR-based Access to Unlicensed Spectrum) to allow operation in unlicensed bands, i.e., NR-unlicensed (NR-U). Allowing unlicensed networks, i.e., networks that operate in unlicensed or shared spectrum to effectively use the available spectrum is an attractive approach to increase system capacity. For convenience, this disclosure will in the following only mention unlicensed spectrum to refer to both unlicensed and shared spectrum.

Although it is more challenging to match the qualities (e.g., as to reliability and/or latency) of the licensed regime on unlicensed spectrum, solutions that allow an efficient use of it as a complement to licensed deployments have the potential to bring great value to the 3GPP operators, and, ultimately, to the 3GPP industry as a whole.

For example, some features in NR may need to be adapted to comply with the special characteristics of the unlicensed band as well as also different regulations. Further, if a UE intended to use unlicensed spectrum, it may employ Clear Channel Assessment (CCA) schemes to find out whether the channel is free or not over a certain period. One such technique is Listen Before Talk (LBT). There are many different flavors or implementation of LBT, depending on which channel access mode the device uses and which type of data it wants to transmit in the upcoming transmission opportunity, referred to as channel occupancy time (COT).

Common for all flavors or implementation of CCA or LBT is that the sensing is done in a particular channel (e.g., corresponding to a defined carrier frequency) and over a predefined bandwidth.

It is currently unclear how a radio device is supposed to carry out receptions and/or transmissions during the idle time (i.e., the IDLE period), e.g., in Frame-Based Equipment. Continuation of e.g. periodical semi-persistent scheduling (SPS) or configured grant (CG) operation would be inefficient leading to radio resource wastage and/or unnecessary battery drains of the radio device.

SUMMARY

Accordingly, there is a need for a (e.g., sidelink relaying) radio communication technique that handles idle times more efficiently in at least some scenarios.

As to a first method aspect, a method of using radio resources in fixed frame periods (FFPs) on a channel for radio communication in a radio network comprising a first node and a second node is provided. Each of the FFPs comprises an idle time (IT) for clear channel assessment (CCA) of the channel and a maximum channel occupancy time (M-COT) for occupying the channel depending on the CCA. The method is performed by the first node. The method comprises or initiates a step of selectively monitoring the radio resources in the FFPs on the channel. The selective monitoring comprises refraining from monitoring a first set of the radio resources. The first set of the radio resources is allocated to a first message of the second node and is partially or completely in the IT. Alternatively or in addition, the method further comprises or initiates a step of selectively transmitting on the radio resources in the FFPs on the channel. The selective transmitting comprises refraining from transmitting on a first set of the radio resources. The first set of the radio channel is allocated to a first message of the first node and is partially or completely in the IT.

The first method aspect may be provided or implemented alone or in combination with any one of the claims in the list of claims. Furthermore, the first method aspect may be provided or implemented alone or in combination with any one of the embodiments described hereinbelow.

By selectively monitoring and/or selectively transmitting on the channel depending on whether the radio resources involved fall (e.g., partly or completely) in the IT, embodiments of the technique allow a suspension and/or a deactivation of the monitoring of and/or the transmission on
- the allocations that fall in the IT, and/or
- the allocations that do not fall in the IT, but their transmission conditioned on that allocations that previously had occur in the idle period.

The (e.g., first and/or second) set of radio resources allocated to the (e.g., first and/or second) message (e.g., of the first and/or second node) may also be referred to as the allocations. The allocation may be for at least one of UL transmission; DL transmission; data transmission; control information transmission; a data channel; a control channel; dynamic scheduling (e.g., by means of a DL control information); semi-persistent scheduling (SPS); and/or may be based on a configured grant (CG).

The channel may be in shared spectrum or unlicensed spectrum.

Herein, the expression "time" may encompass a time interval or a period (e.g., a sub-period of the FFP). For example, the IT may be an idle time interval or an idle period. The M-COT may be a maximum channel occupancy time interval or a maximum channel occupancy period.

Herein, the expression "occupying" the channel may encompass transmitting on the channel. For example, the channel may be selectively occupied by the second node of a radio network for selectively transmitting a message to the first node of the radio network.

Furthermore, the second node may refrain from transmitting the first message, if the first set of radio resources allocated to the first message of the second node is partially or completely in the IT. For example, the second node may refrain from occupying the set of radio resources on the channel, if the set of radio resources of the message of the second node is partially or completely in the IT.

The refraining from monitoring the first set of the radio resources (e.g., according to the first and/or second method aspect) may comprise refraining from decoding or refraining from attempting to decode the first message of the second node.

The selective monitoring (e.g., according to the first and/or second method aspect) may further comprise monitoring a second set of the radio resources, which is allocated to a second message of the second node and which is completely in the M-COT.

The monitoring of the second set of the radio resources (e.g., according to the first and/or second method aspect) may comprise decoding or attempting to decode the second message of the second node.

The channel (e.g., according to the first and/or second method aspect) may be occupied by the second node for transmitting the second message on the second set of radio resources during a channel occupancy time (COT) within the M-COT subsequent to the CCA that may be indicating clearance of the channel.

The first node (e.g., according to the first and/or second method aspect) may be a radio device and the second node may be a base station providing radio access to the radio device.

The radio communication (e.g., according to the first and/or second method aspect) may use at least one of an uplink (UL) and a downlink (DL) between the radio device and the base station.

The radio network (e.g., according to the first and/or second method aspect) may comprise a radio access network (RAN). The RAN may comprise the base station.

The radio device may be configured for radio access to the RAN.

The first node (e.g., according to the first and/or second method aspect) may be a first radio device and the second node may be a second radio device providing radio access to the first radio device.

The radio communication (e.g., according to the first and/or second method aspect) may use a sidelink (SL) between the first radio device and the second radio device.

The radio network (e.g., according to the first and/or second method aspect) may comprise an ad hoc radio network and/or mesh radio network.

The second radio device (e.g., according to the first and/or second method aspect) may be a relay radio device within radio coverage provided by a RAN. The first radio device may be in a relaying radio connection with the RAN through the second radio device.

The FFPs (e.g., according to the first and/or second method aspect) may comprise at least one first FFP used by the first node and at least one second FFP used by the second node.

The first node and the second node (e.g., according to the first and/or second method aspect) may use the same or synchronized FFPs.

A first FFP used by the first node and a second FFP used by the second node (e.g., according to the first and/or second method aspect) may be synchronized, if the IT of the first FFP of the first node does not overlap with the M-COT of the second FFP of the second node. Alternatively or in addition, a first FFP used by the first node and a second FFP used by the second node (e.g., according to the first and/or second method aspect) may be synchronized if the IT of the second FFP of the second node does not overlap with the M-COT of the first FFP of the first node.

Alternatively or in addition, a first FFP used by the first node and a second FFP used by the second node (e.g., according to the first and/or second method aspect) may be synchronized if the IT of the first FFP of the first node fully overlaps with the IT of the second FFP of the second node. Alternatively or in addition, a first FFP used by the first node and a second FFP used by the second node (e.g., according to the first and/or second method aspect) may be synchronized if the M-COT of the first FFP of the first node fully overlaps with the M-COT of the second FFP of the second node.

Optionally, the FFPs of the first node and the second node may be synchronized up to a propagation time or a round-trip time of a radio signal in the radio communication on the channel.

The FFPs (e.g., according to the first and/or second method aspect) may comprise at least one first FFP used by the first node and at least one second FFP used by the second node. The first and second FFPs may be not synchronized.

A first FFP used by the first node and a second FFP used by the second node (e.g., according to the first and/or second method aspect) may be not synchronized, if the IT of the first FFP of the first node overlaps with or is within the M-COT of the second FFP of the second node. Alternatively or in addition, a first FFP used by the first node and a second FFP used by the second node (e.g., according to the first and/or second method aspect) may be not synchronized if the IT of the second FFP of the second node overlaps with or is within the M-COT of the first FFP of the first node. Alternatively or in addition, a first FFP used by the first node and a second FFP used by the second node (e.g., according to the first and/or second method aspect) may be not synchronized if the IT of the first FFP of the first node does not coincide or not fully overlap with the IT of the second FFP of the second node. Alternatively or in addition, a first FFP used by the first node and a second FFP used by the second node (e.g., according to the first and/or second method aspect) may be not synchronized if the M-COT of the first FFP of the first node does not coincide or not fully overlap with the M-COT of the second FFP of the second node.

The FFPs (e.g., according to the first and/or second method aspect), may be assigned to the first node by the second node.

The at least one first FFP used by the first node (e.g., according to the first and/or second method aspect) may be assigned for the first node by the second node. Alternatively or in addition the at least one second FFPs used by the second node may be assigned for the second node by the second node.

The assigning may comprise receiving at control message from the second node. The control message may be indicative of a configuration of the FFPs and/or the at least one first FFP. For example, the at least one first FFP of the radio device are configured by the base station. Alternatively or in addition, the at least one second FFP for the base station are assigned by the base station.

The CCA may be performed (e.g., by the first node or the second node) at the end of the IT used by the respective node. The beginning of the M-COT may be defined relative to a CCA performed by the respective node.

The method (e.g., according to the first and/or second method aspect) may further comprise or initiate performing the CCA by the first node. Optionally, the CCA performed by the first node may define an end of the IT of the at least one first FFP used by the first node. Alternatively or in addition, the CCA performed by the first node may define a beginning of the M-COT of the at least one first FFP used by the first node.

The at least one first FFP and the at least one second FFP may be not synchronized (i.e., asynchronous and/or out of synchronization) as a result of the first node performing the CCA (preferably independent of the second node) for defining the at least one first FFP used by the first node.

Each of the radio resources may comprise at least one resource block (RB) set in a frequency domain of the channel and/or at least one a transmission time interval (TTI) in a time domain.

The selective transmitting (e.g., according to the first and/or second method aspect) may further comprise transmitting on a second set of the radio resources. The radio resources may be allocated to a second message of the first node which may be completely in the M-COT.

The channel (e.g., according to the first and/or second method aspect) may be occupied by the first node for the transmitting of the second message on the second set of radio resources during a COT within the M-COT subsequent to the CCA indicating clearance of the channel.

The selective monitoring (e.g., according to the first and/or second method aspect) may comprise refraining from the monitoring of the first set of the radio resources. The first set of radio resources may be allocated to the first message of the second node which may be partially or completely in the IT of the at least one second FFP of the second node.

The selective monitoring (e.g., according to the first and/or second method aspect) may further comprise the monitoring of the second set of the radio resources. The second set of radio resources may be allocated to a second message of the second node which may be completely in the M-COT of the at least one second FFP of the second node.

The selective transmitting (e.g., according to the first and/or second method aspect) may comprise refraining from the transmitting on the first set of the radio resources. The first set of the radio resources may be is allocated to the first message of the first node and may be partially or completely in the IT of the at least one first FFP of the first node.

The selective transmitting (e.g., according to the first and/or second method aspect) may further comprise transmitting on a second set of the radio resources. The second set of radio resources may be allocated to a second message of the first node and may be completely in the M-COT of the at least one first FFP of the first node.

The channel (e.g., according to the first and/or second method aspect) may be shared by at least two different RANs. Alternatively or in addition the channel may be accessible by at least two different RANs. Alternatively or in addition the channel may be used or usable by at least two different radio access technologies (RATs).

The channel (e.g., according to the first and/or second method aspect) may be on a shared spectrum. Alternatively or in addition, the channel may be on an unlicensed spectrum.

The first node may be configured for a periodically repeating FFP. Alternatively or in addition, second node may be configured for a periodically repeating FFP.

The M-COT may correspond to a maximum transmission time (e.g., a transmission opportunity, TxOp), e.g., subsequent to the CCA indicating clearance of the channel (i.e., a successful CCA) in the IT. For example, the first and/or second node (e.g., the radio device and/or the base station) may transmit a message on the channel if (e.g., only if) the CCA is indicative of the clearance of the channel.

The selective monitoring performed by the first node (e.g., according to the first and/or second method aspect) may comprise continuing to monitor the radio resources in the IT of the at least one first FFP for a second message of the second node, optionally a serving base station of the first node, if the second message of the second node requires a corresponding and/or subsequent response as a second message of the first node in the M-COT of the at least one first FFP.

The second message of the second node (e.g., according to the first and/or second method aspect) may comprise a scheduling grant and the second message of the first node may comprise or use a physical uplink shared channel (PUSCH) in response to the scheduling grant. Alternatively or in addition, the second message of the second node may further comprise or use a physical downlink shared channel (PDSCH) and the second message of the first node may comprise a hybrid automatic repeat request (HARQ) feedback in response to the PDSCH of the second node.

The selective transmission performed by the first node (e.g., according to the first and/or second method aspect) may comprise refraining from the transmission of the second message of the first node, if a timing of the transmission falls within the IT of the first FFP of the first node.

The selective monitoring performed by the first node (e.g., according to the first and/or second method aspect) may comprise monitoring a second set of radio resources allocated to a second message of the second node. The second set may be partly or completely in the IT of the second FFP and may be completely in the M-COT of the first FFP.

The selective transmitting performed by the first node (e.g., according to the first and/or second method aspect) may comprise transmitting on a second set of radio resources allocated to a second message of the first node. The second set may be partly or completely in the IT of the first FFP and may be completely in the M-COT of the second FFP.

Two or more messages of the second node (e.g., according to the first and/or second method aspect), optionally two or more DL transmission, may be colliding. One of the messages or DL transmissions occurring over the IT may be discarded, optionally irrespective of a priority and/or an identifier (ID) associated with the discarded message or DL transmission.

The selective transmission performed by the first node (e.g., according to the first and/or second method aspect) may comprise refraining from the transmission of a second message of the first node, if a timing of the transmission falls within the IT, optionally the IT of the synchronized FFPs or the IT of the first FFP of the first node or the IT of the second FFP of the second node. The radio resources of the second message may be allocated by semi-persistent scheduling (SPS) or a configured grant, optionally wherein the second message may comprise a medium access control (MAC) packet data unit (PDU).

As to a second method aspect, a method of using radio resources in FFPs on a channel for radio communication in a radio network comprising a first node and a second node is provided. Each of the FFPs comprises an IT for CCA of the channel and an M-COT for occupying the channel depending on the CCA. The method performed by the second node comprises or initiates a step of selectively monitoring the radio resources in the FFPs on the channel. The selective monitoring comprises refraining from monitoring a first set of the radio resources. The first set of the radio resources is allocated to a first message of the first node and is partially or completely in the IT. Alternatively or in addition, the method performed by the second node comprises or initiates a step of selectively transmitting on the radio resources in the FFPs on the channel. The selective transmitting comprises refraining from transmitting on a first set of the radio resources. The first set of the radio resources is allocated to a first message of the second node and is partially or completely in the IT.

The second method aspect may be provided or implemented alone or in combination with any one of the claims in the list of claims. Furthermore, the second method aspect may be provided or implemented alone or in combination with any one of the embodiments described hereinbelow.

The second node (e.g., according to the first and/or second method aspect) may assign the FFPs for at least one of the first node and the second node.

The method may further comprise or initiate a step of performing the CCA by the second node. Optionally, the CCA performed by the by the second node may define an end of the IT of the at least one second FFP used by the second node (200). Alternatively or in addition, the CCA performed by the second node (200) may define a beginning of the M-COT of the at least one second FFP used by the second node.

The second method aspect may further comprise any feature and/or any step disclosed in the context of the first method aspect, or a feature and/or step corresponding thereto, e.g., a receiver counterpart to a transmitter feature or step.

As to another aspect, a computer program product is provided. The computer program product comprises program code portions for performing any one of the steps of the first method aspect or the second method aspect disclosed herein when the computer program product is executed by one or more computing devices. The computer program product may be stored on a computer-readable recording medium. The computer program product may also be provided for download, e.g., via the radio network, the RAN, the Internet and/or the host computer. Alternatively, or in addition, the method may be encoded in a Field-Programmable Gate Array (FPGA) and/or an Application-Specific Integrated Circuit (ASIC), or the functionality may be provided for download by means of a hardware description language.

As to a first device aspect, a radio device for using radio resources in FFPs on a channel for radio communication in a radio network comprising a first node and a second node is provided. Each of the FFPs comprises an IT for CCA of the channel and an M-COT for occupying the channel depending on the CCA. The radio device comprises memory operable to store instructions and processing circuitry operable to execute the instructions, such that the radio device is operable to selectively monitor the radio resources in the FFPs on the channel. The selective monitoring comprises refraining from monitoring a first set of the radio resources. The first set of the radio resources is allocated to a first message of the second node and is partially or completely in the IT. Alternatively or in addition, the radio device comprises memory operable to store instructions and processing circuitry operable to execute the instructions, such that the radio device is further operable to selectively transmit on the radio resources in the FFPs on the channel. The selective transmitting comprises refraining from transmitting on a first set of the radio resources. The first set of radio devices is allocated to a first message of the first node and is partially or completely in the IT.

The radio device according to the first device aspect may further be operable to perform any of the steps of the first method aspect.

The first device aspect may be provided or implemented alone or in combination with any one of the claims in the list of claims. Furthermore, the first device aspect may be provided or implemented alone or in combination with any one of the embodiments described hereinbelow.

As to a further first device aspect, a radio device for using radio resources in FFPs on a channel for radio communication in a radio network comprising a first node and a second node is provided. Each of the FFPs comprises an IT for CCA of the channel and an M-COT for occupying the channel depending on the CCA. The radio device is configured to selectively monitor the radio resources in the FFPs on the channel. The selective monitoring comprises refraining from monitoring a first set of the radio resources. The first set of radio resources is allocated to a first message of the second node and is partially or completely in the IT. Alternatively or in addition, the radio device is further configured to selectively transmit on the radio resources in the FFPs on the channel. The selective transmitting comprises refraining from transmitting on a first set of the radio resources. The first set of the radio resources is allocated to a first message of the first node and are partially or completely in the IT.

The radio device according to the further first device aspect may be further configured to perform any of the steps of the first method aspect.

The further first device aspect may be provided or implemented alone or in combination with any one of the claims in the list of claims. Furthermore, the further first device aspect may be provided or implemented alone or in combination with any one of the embodiments described hereinbelow.

As to a second device aspect, a base station for using radio resources in FFPs on a channel for radio communication in a radio network comprising a first node and a second node is provided. Each of the FFPs comprises an IT for CCA of the channel and an M-COT for occupying the channel depending on the CCA. The radio device comprising memory operable to store instructions and processing circuitry operable to execute the instructions, such that the radio device is operable to selectively monitor the radio resources in the FFPs on the channel. The selective monitoring comprises refraining from monitoring a first set of radio resources. The first radio resources are allocated to a first message of the first node and are partially or completely in the IT. The radio device further comprises memory operable to store instructions and processing circuitry operable to execute the instructions, such that the radio device is operable to selectively transmit on the radio resources in the FFPs on the channel. The selective transmitting comprises refraining from transmitting on a first set of the radio resources. The first set of radio resources is allocated to a first message of the second node and is partially or completely in the IT.

The base station according to the second device aspect may be further operable to perform any of the steps of the second method aspect.

The second device aspect may be provided or implemented alone or in combination with any one of the claims in the list of claims. Furthermore, the second device aspect may be provided or implemented alone or in combination with any one of the embodiments described hereinbelow.

As to a further second device aspect, a base station for using radio resources in FFPs on a channel for radio communication in a radio network comprising a first node and a second node is provided. Each of the FFPs comprises an IT for CCA of the channel and an M-COT for occupying the channel depending on the CCA. The base station comprises memory operable to store instructions and processing circuitry operable to execute the instructions, such that the base station is operable to selectively monitor the radio resources in the FFPs on the channel. The selective monitoring comprises refraining from monitoring a first set of the radio resources. The first radio resources are allocated to a first message of the first node and are may be partially or completely in the IT. The radio device further comprises memory operable to store instructions and processing circuitry operable to execute the instructions, such that the radio device is operable to selectively transmit on the radio resources in the FFPs on the channel. The selective transmitting comprises refraining from transmitting on a first set of the radio resources. The first set of radio resources are allocated to a first message of the second node and are partially or completely in the IT.

The base station according to the further second device aspect may be further operable to perform any of the steps of the second method aspect.

The further second device aspect may be provided or implemented alone or in combination with any one of the claims in the list of claims. Furthermore, the further second device aspect may be provided or implemented alone or in combination with any one of the embodiments described hereinbelow.

As to a still further device aspect, a communication system including a host computer is provided. The host computer comprises a processing circuitry configured to provide user data, e.g., included in the first message. The host computer further comprises a communication interface configured to forward the user data to a cellular network (e.g., the RAN and/or the base station) or ad hoc radio network for transmission to a UE. A processing circuitry of the cellular network is configured to execute any one of the steps of the first and/or second method aspects. The UE comprises a radio interface and processing circuitry, which is configured to execute any one of the steps of the first method aspect.

The communication system may further include the UE. Alternatively or in addition, the cellular network may further include one or more base stations configured for radio communication with the UE and/or to provide a data link between the UE and the host computer using the second method aspect.

The radio network of the communication system may further comprise a base station or a radio device functioning as a gateway. The base station or the radio device functioning as a gateway may be configured to communicate with the UE.

The base station or the radio device functioning as a gateway may comprise processing circuitry. The processing circuitry may be configured to execute any of the steps of the second method aspect.

The processing circuitry of the host computer may be configured to execute a host application, thereby providing the user data and/or any host computer functionality described herein. Alternatively, or in addition, the processing circuitry of the UE may be configured to execute a client application associated with the host application.

Any aspect of the technique may be implemented as a method of controlling transmission and/or monitoring (e.g., of a radio device) conditioned with an idle time (IT, i.e., an "IDLE Period"). Alternatively or in addition, any aspect of the technique may be implemented for or in the context of at least one of NR-U, a channel occupancy mechanism (i.e., CCA or sensing of the channel), FBE, and a radio resource structure comprising ITs (i.e., idle periods).

Some aspects of the technique may be implemented by changes and/or additions to the 3GPP document TS 38.213, version 16.2.0 and/or the 3GPP document TS 38.214, version 16.2.0. Alternatively or in addition, some aspects of the technique may be implemented by additions related to UL PI signaling.

Furthermore, the technique may be applied in the context of 3GPP New Radio (NR), optionally using a sidelink (SL). Unlike a SL according to 3GPP LTE, a SL according to 3GPP NR can provide a wide range of QoS levels. The technique may be implemented in accordance with a 3GPP specification, e.g., for 3GPP release 17. The technique may be implemented for 3GPP LTE or 3GPP NR according to a modification of the 3GPP document TS 23.303, version 16.0.0 or for 3GPP NR according to a modification of the 3GPP document TS 33.303, version 16.0.0. In any radio access technology (RAT), the technique may be implemented for SL relay selection. The SL may be implemented using proximity services (ProSe), e.g. according to a 3GPP specification.

Any radio device may be a user equipment (UE), e.g., according to a 3GPP specification, e.g., the 3GPP document TS 38.213, version 16.2.0; and/or the 3GPP document TS 38.214, version 16.2.0.

The radio device and/or the base station and/or the RAN may form, or may be part of, a radio network, e.g., according to the Third Generation Partnership Project (3GPP) or according to the standard family IEEE 802.11 (Wi-Fi). The first method aspect and/or the second method aspect may be performed by one or more embodiments of the radio device and the RAN (e.g., a base station), respectively.

The RAN may comprise one or more base stations, e.g., each or collectively performing the second method aspect. Alternatively or in addition, the radio network may be a vehicular, ad hoc and/or mesh network comprising two or more radio devices, e.g., acting as a remote radio device as the first node and/or a relay radio device as the second node.

Any of the radio devices may be a 3GPP user equipment (UE) or a Wi-Fi station (STA). The radio device may be a mobile or portable station, a device for machine-type communication (MTC), a device for narrowband Internet of Things (NB-IoT) or a combination thereof. Examples for the UE and the mobile station include a mobile phone, a tablet computer and a self-driving vehicle. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in a manufacturing plant, household appliances and consumer electronics.

Whenever referring to the RAN, the RAN may be implemented by one or more base stations.

The radio device may be wirelessly connected or connectable (e.g., according to a radio resource control, RRC, state or active mode) with the base station or the relay radio device (e.g., according to 3GPP Proximity Services, ProSe).

The base station may encompass any station that is configured to provide radio access to any of the radio devices. The base stations may also be referred to as cell, transmission and reception point (TRP), radio access node or access point (AP). The base station and/or the relay radio device may provide a data link to a host computer providing the user data to the remote radio device or gathering user data from the remote radio device. Examples for the base stations may include a 3G base station or Node B, 4G base station or eNodeB, a 5G base station or gNodeB, a Wi-Fi AP and a network controller (e.g., according to Bluetooth, ZigBee or Z-Wave).

The RAN may be implemented according to the Global System for Mobile Communications (GSM), the Universal Mobile Telecommunications System (UMTS), 3GPP Long Term Evolution (LTE) and/or 3GPP New Radio (NR).

Any aspect of the technique may be implemented on a Physical Layer (PHY), a Medium Access Control (MAC) layer, a Radio Link Control (RLC) layer, a packet data convergence protocol (PDCP) layer, and/or a Radio Resource Control (RRC) layer of a protocol stack for the radio communication.

Any one of the devices, the UE, the base station, the communication system or any node or station for embodying the technique may further include any feature disclosed in the context of the method aspects, and vice versa. Particularly, any one of the units and modules disclosed herein may be configured to perform or initiate one or more of the steps of the method aspects.

BRIEF DESCRIPTION OF THE DRAWINGS

Further details of embodiments of the technique are described with reference to the enclosed drawings, wherein:

FIG. 3 shows a flowchart for a method of using radio resources in a fixed frame period, which method may be implementable by the device of FIG. 1;

FIG. 4 shows a flowchart for a method of using radio resources in a fixed frame period, which method may be implementable by the device of FIG. 2;

FIG. 6A to 15 schematically examples of selectively monitoring of and/or selectively transmitting on radio resources in fixed frame periods, which may be implementable in any one of the devices of FIGS. 1 and 2 or any one of the methods of FIGS. 3 and 4;

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a New Radio (NR) or 5G implementation, it is readily apparent that the technique described herein may also be implemented for any other radio communication technique, including a Wireless Local Area Network (WLAN) implementation according to the standard family IEEE 802.11, 3GPP LTE (e.g., LTE-Advanced or a related radio access technique such as MulteFire), for Bluetooth according to the Bluetooth Special Interest Group (SIG), particularly Bluetooth Low Energy, Bluetooth Mesh Networking and Bluetooth broadcasting, for Z-Wave according to the Z-Wave Alliance or for ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
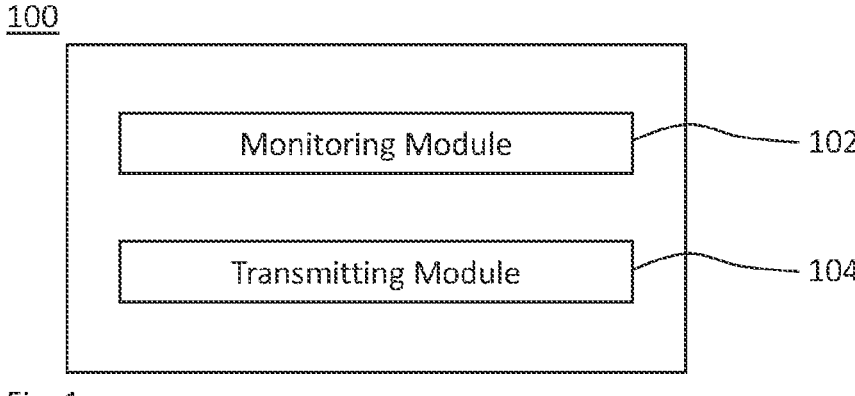
FIG. 1 shows a schematic block diagram of an embodiment of a device for using radio resources in a fixed frame period, which may be embodied by a radio device.

FIG. 1 schematically illustrates a block diagram of an embodiment of a device for using radio resources in fixed frame periods (FFPs). The device is generically referred to by reference sign 100.

The radio resources in the FFPs are on a channel for radio communication in a radio network. The radio network comprises a first node and a second node. Each of the FFPs comprises an IT for CCA of the channel and a M-COT for occupying the channel depending on the CCA.

The device 100 comprises at least one of a monitoring module 102 that performs the step of selective monitoring and a transmitting module 104 that performs the step of selective transmitting according to the first device aspect and/or any one of the embodiments described herein below, optionally in combination.

The monitoring module 102 selectively monitors the radio resources in the FFPs on the channel. The selective monitoring comprises refraining from monitoring a first set of the radio resources, which is allocated to a first message of the second node and which is partially or completely in the IT.

The transmitting module 104 selectively transmits on the radio resources in the FFPs on the channel. The selective transmitting comprises refraining from transmitting on a first set of the radio resources, which is allocated to a first message of the first node and which is partially or completely in the IT.

Any of the modules of the device 100 may be implemented by units configured to provide the corresponding functionality.

The device 100 may also be referred to as, or may be embodied by, the first node, e.g., a radio device (or briefly: UE). The first node 100 and the second node 200 may be in direct radio communication, e.g., during FFPs. The second node may be embodied by the device 200.

Figure 2:
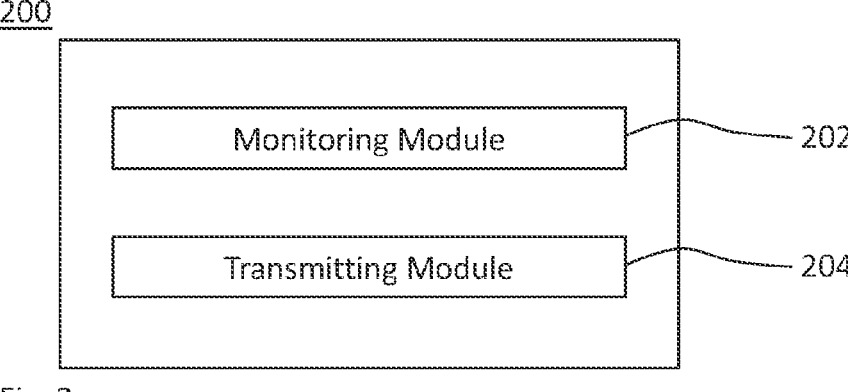
FIG. 2 shows a schematic block diagram of an embodiment of a device for using radio resources in a fixed frame period, which may be embodied by a base station.

FIG. 2 schematically illustrates a block diagram of an embodiment of a device for using radio resources in FFPs. The device is generically referred to by reference sign 200.

The radio resources in the FFPs are on a channel for radio communication in a radio network. The radio network comprises a first node and a second node. Each of the FFPs comprises an IT for CCA of the channel and a M-COT for occupying the channel depending on the CCA.

The device 200 comprises at least one of a monitoring module 202 that performs the step of selective monitoring and a transmitting module 204 that performs the step of selective transmitting according to the second device aspect.

The monitoring module 202 selectively monitors the radio resources in the FFPs on the channel. The selective monitoring comprises refraining from monitoring a first set of the radio resources, which is allocated to a first message of the first node and which is partially or completely in the IT.

The transmitting module 204 selectively transmits on the radio resources in the FFPs on the channel. The selective transmitting comprises refraining from transmitting on a first set of the radio resources, which is allocated to a first message of the second node and which is partially or completely in the IT.

Any of the modules of the device 200 may be implemented by units configured to provide the corresponding functionality.

The device 200 may also be referred to as, or may be embodied by, the second node, e.g., a base station 200. The base station 200 and the radio device 100 may be in direct radio communication, e.g., at least during the selective monitoring and/or transmitting. The first node may be embodied by the device 100.

FIG. 3 shows an example flowchart for a method 300 of using radio resources in FFPs according to the first method aspect.

The radio resources in the FFPs are on a channel for radio communication in a radio network. The radio network comprises a first node and a second node. Each of the FFPs comprises an IT for CCA of the channel and a M-COT for occupying the channel depending on the CCA.

The method 300 comprises at least one of a monitoring step 302 and a transmitting step 304.

In the monitoring step 302, the radio resources in the FFPs on the channel are selectively monitored. The selective monitoring comprises refraining from monitoring a first set of the radio resources, which is allocated to a first message of the second node and which is partially or completely in the IT.

In the transmitting step 304, the first node selectively transmits on the radio resources in the FFPs on the channel. The selective transmitting comprises refraining from transmitting on a first set of the radio resources, which is allocated to a first message of the first node and which is partially or completely in the IT.

The method 300 may be performed by the device 100. For example, the modules 102 and 104 may perform the steps 302 and 304, respectively.

FIG. 4 shows an example flowchart for a method 400 of using radio resources in FFPs according to the second method aspect.

The radio resources in the FFPs are on a channel for radio communication in a radio network. The radio network comprises a first node and a second node. Each of the FFPs comprises an IT for CCA of the channel and a M-COT for occupying the channel depending on the CCA.

In a step 402, the radio resources in the FFPs on the channel are selectively monitored. The selective monitoring comprises refraining from monitoring a first set of the radio resources, which is allocated to a first message of the first node and which is partially or completely in the IT.

In a step 404, the second node selectively transmits on the radio resources in the FFPs on the channel. The selective transmitting comprises refraining from transmitting on a first set of the radio resources, which is allocated to a first message of the second node and which is partially or completely in the IT.

The method 400 may be performed by the device 200. For example, the modules 202 and 204 may perform the steps 402 and 404, respectively.

In any aspect, the technique may be applied to uplink (UL), downlink (DL) or direct communications between radio devices, e.g., device-to-device (D2D) communications or sidelink (SL) communications.

Each of the device 100 and the device 200 may be a radio device or a base station. Herein, any radio device may be a mobile or portable station and/or any radio device wirelessly connectable to a base station or RAN, or to another radio device. For example, the radio device may be a user equipment (UE), a device for machine-type communication (MTC) or a device for (e.g., narrowband) Internet of Things (I). Two or more radio devices may be configured to wirelessly connect to each other, e.g., in an ad hoc radio network or via a 3GPP SL connection. Furthermore, any base station may be a station providing radio access, may be part of a radio access network (RAN) and/or may be a node connected to the RAN for controlling the radio access. For example, the base station may be an access point, for example a Wi-Fi access point.

Herein, any the CCA may comprise or may be comprised in any implementation of listen before talk (LBT), which may also be referred to as sensing or access operation. Further, two modes of access operations may be defined, e.g., including a Frame-Based Equipment (FBE) and Load-Based Equipment (LBE). In FBE mode, the sensing period is simple (e.g., a periodic FFP), while the sensing scheme in LBE mode is more complex.

The FBE mode may use a semi-static channel occupancy. In the FBE mode as defined in 3GPP (e.g., as illustrated in FIG. 5), the gNB 200 assigns Fixed Frame Periods (FFPs), senses the channel for 9 us just before the FFP boundary (i.e., performs the CCA 506), and if the channel is sensed to be free (i.e. clearance of the channel), the gNB 200 starts with a downlink (DL) transmission, and/or allocates resources among different UEs 100 in the FFP 500.

This procedure may be repeated with a certain periodicity. In the FFP 500, DL/UL transmissions are only allowed within the COT (or M-COT 504), a subset of FFP resource, where the remaining idle time 502 (IT or Idle period) is reserved so that other nodes (e.g., 100 or 200) also have the chance to sense and utilize the channel. Hence in FBE operations, the channel is sensed at specific intervals just before the FFP boundary and/or at the beginning of the M-COT 504.

Figure 5:
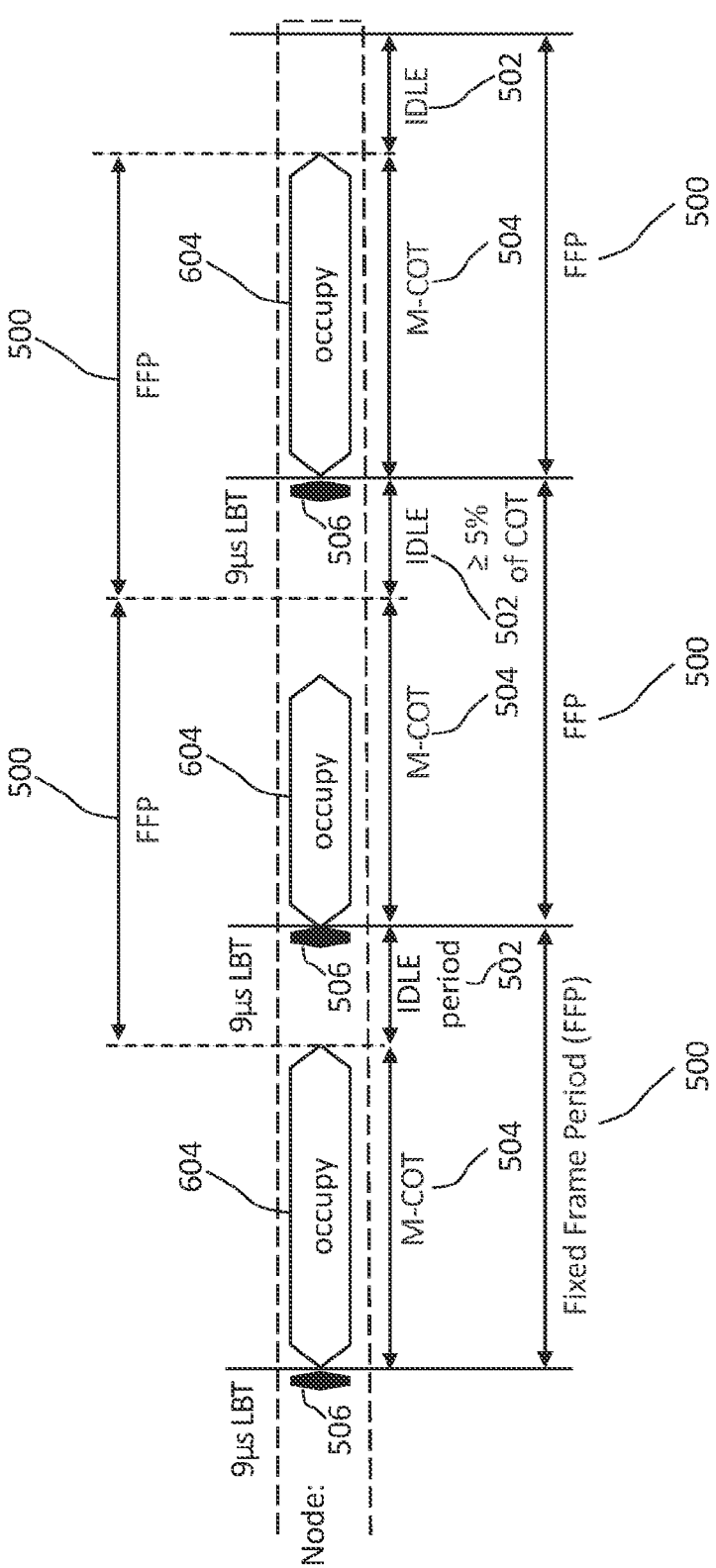
FIG. 5 schematically illustrates radio resources and temporal structures of fixed frame periods, which may be implementable in any one of the devices of FIGS. 1 and 2 or any one of the methods of FIGS. 3 and 4.

FIG. 5 schematically illustrates an example of an FBE procedure, e.g. depicting 3GPP semi-static channel occupancy. The FBE procedure may be implemented according to ETSI harmonized standard EN 301 893, e.g. Section 4.2.7.3.1. FIG. 5 illustrates two alternative definitions of the FFP 500.

The FFP 500 can be set to values between 1 and 10 ms and can be changed after a minimum of 200 ms. The IDLE period 502 may be a regulatory requirement and is supposed to be at least $T_{IDLE} \geq \max(0.05{*}COT, 100 \text{ μs})$ or $T_{IDLE} \geq \max(0.05{*}M{-}COT, 100 \text{ μs})$. In the 3GPP document TS 37.213, version 16.2.0, this may have been simplified or reduced to be $T_{IDLE} \geq \max(0.05{*}FFP, 100 \text{ μs})$, i.e. the maximum channel occupancy time, M-COT, would be defined as $T_{M{-}COT}{=}\min(0.95{*}FFP, FFP{-}0.1 \text{ ms})$. So for an FFP 500 of 10 ms, the M-COT would be 9.5 ms, while for 1 ms FFP the M-COT would be 0.9 ms=0.9*FFP.

The technique may be implemented using a dynamic channel occupancy (LBE mode). The default LBT mechanism for LBE operation, LBT category 4, is similar to existing Wi-Fi operation, wherein the node 100 and/or 200 may sense the channel at any time and start transmitting if the channel is free after a deferral and back-off period. For specific cases, e.g. shared COT, other LBT categories allowing a very short sensing period, are allowed.

The channel may be an LBT channel. The technique may be implemented using LBT channels in wideband operation mode. There are different wideband operation modes. The nodes perform LBT on a certain bandwidth referred to as LBT channel, which are up to 20 MHz (or Bran channelization, which are also used by Wi-Fi). The transmission bandwidth is therefore also limited by the LBT bandwidth. The channels can however be aggregated in wideband operation modes using either carrier aggregation, or using one wideband carrier which is divided into several so-called resource block sets, RB set (also referred to as LBT bandwidth or LBT sub-band). In either modes, the LBT can be performed according to one of the following procedures:

(1) independent CAT4 LBT on each of the carriers,
(2) on primary carrier performs CAT4 LBT, and sensing for a fixed CCA one the remaining carries just before the end of the CAT4 LBT on the primary carrier.

For conciseness, different embodiments are described collectively for the radio device (e.g., UE) aspect and the base station (e.g., gNB) aspect. The skilled person understands that the below disclosure provides disclosure for each of the aspects separately for each of the embodiments. Furthermore, features of different embodiments may be combined.

In the FIGS. 6A to 15, the steps 304 and 404 of selectively transmitting may correspond to the beginning of an arrow, wherein the upper portion of each figure relates to the base station 200 (exemplified by a gNB) performing the method 400, and/or the lower portion relates to the radio device 100 (exemplified by a UE) performing the method 300. Alternatively or in addition, the steps 302 and 402 of selectively monitoring may correspond to end of an arrow.

Figure 6A:
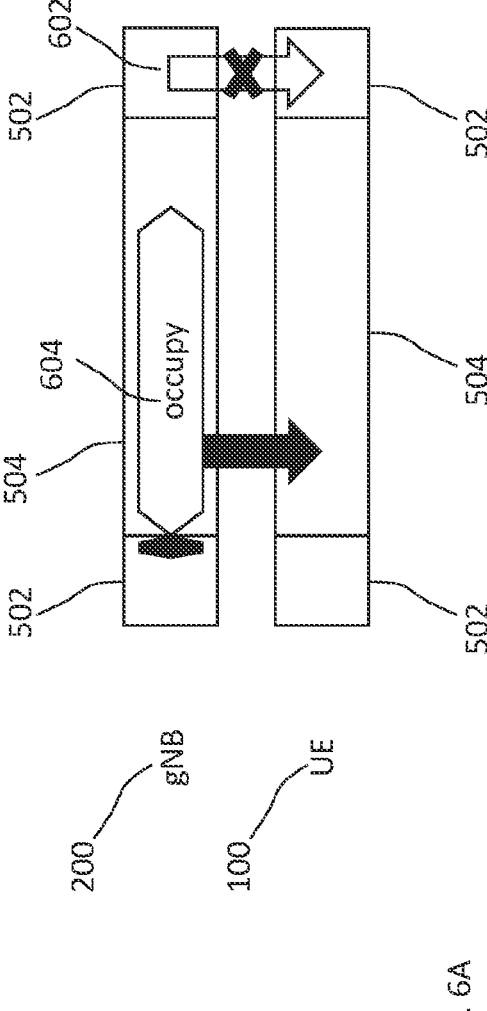
Figure 6B:
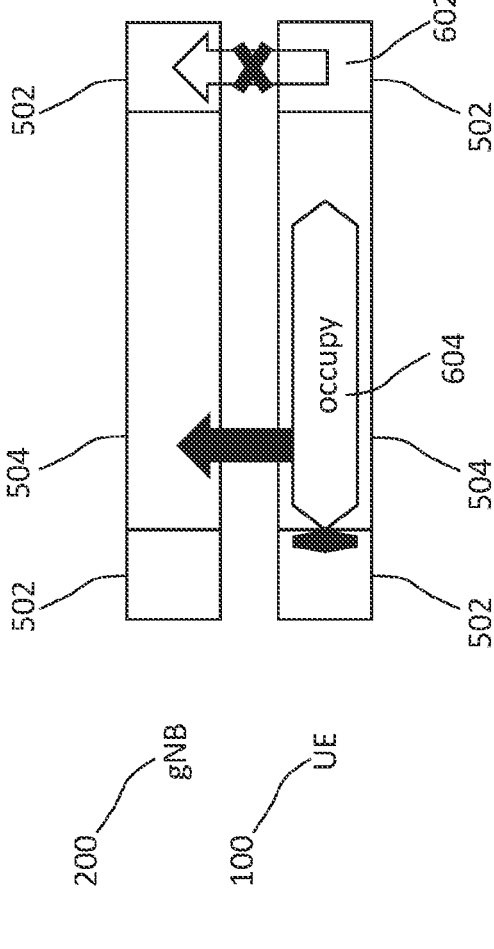

In first and second variants of a first embodiment, e.g., as illustrated in the FIGS. 6A and 6B, respectively, the UE 100 has no own FFP cycle of FFPs 500 and/or the FFP cycles of the UE 100 and gNB 200 are synchronized.

In the first embodiment, the UE 100 refrains from monitoring, i.e., the UE 100 is not expected to monitor or does not monitor or does not attempt decoding any PDSCH allocation (e.g., dynamic or SPS based) or, other DL transmissions that fully or partially occur on the IT (i.e. the "idle period"). This can save UE battery for unnecessary decoding attempts.

As to variant of any embodiment, the UE 100 is configured with its own FFP cycle (i.e., UE 100 may initiate transmissions outside of the COT or M-COT of the gNB.

In a first variant, e.g., as illustrated in FIG. 6A, if the idle period 502 of the UE 100 and the gNB 200 are synchronized, the UE 100 is not expected to monitor any DL transmissions from the serving gNB 100. In a second variant, as illustrated in FIG. 6B, if the idle period 502 of the UE 100 and the gNB 200 are synchronized, the UE 100 is not expected to perform UL transmission in the idle period 502.

In further variants (e.g., the below variants), the idle period 502 (i.e., the first and second FFPs) of the UE 100 and the gNB 200 are not synchronized. For example, the ITs 502 do not fully overlap. In other words, the UE has its own FFP cycle (i.e., the first FFP 500) that is not synchronized with FFP cycle of gNB (i.e., the second FFP 500).

Figure 7:
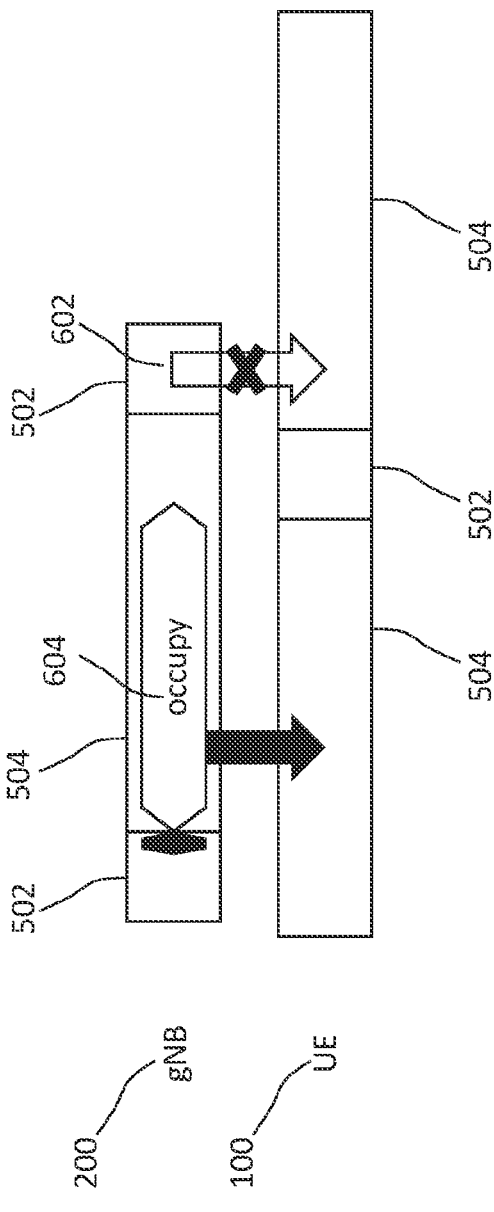

In a third variant (e.g., of the first embodiment), e.g. as illustrated in FIG. 7, the UE 100 is not expected to monitor and/or not to attempt decoding any DL transmissions (i.e., the first message of the gNB 200) as part of a COT or M-COT 504 initiated by the CCA performed by the gNB in the idle period 502 of gNB.

Figure 8:
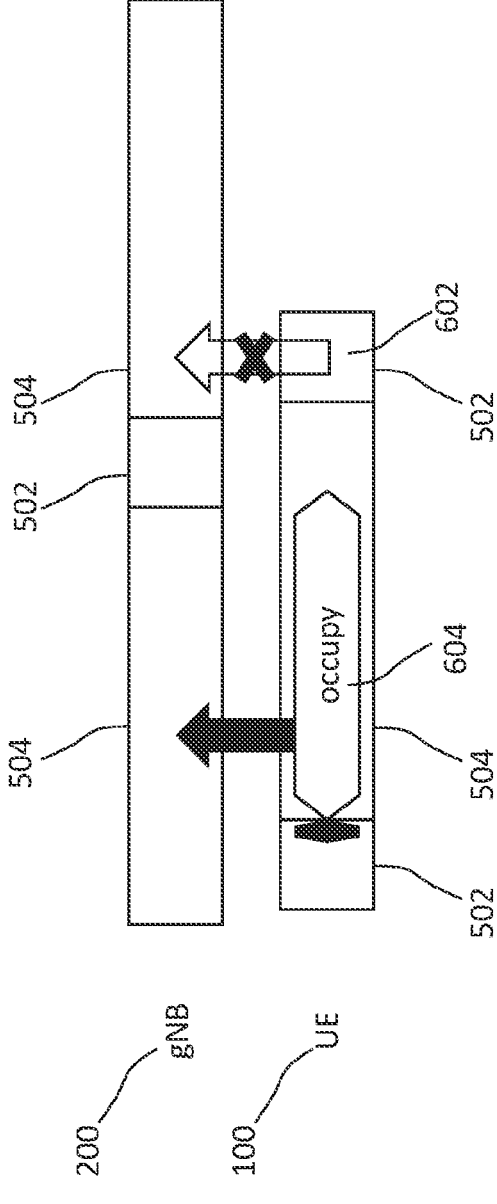

In a fourth variant (e.g., of the first embodiment), e.g. as illustrated in FIG. 8, the gNB 200 does not expect UL transmissions as part of the COT initiated by the UE in the UE's idle period 502.

Figure 9:
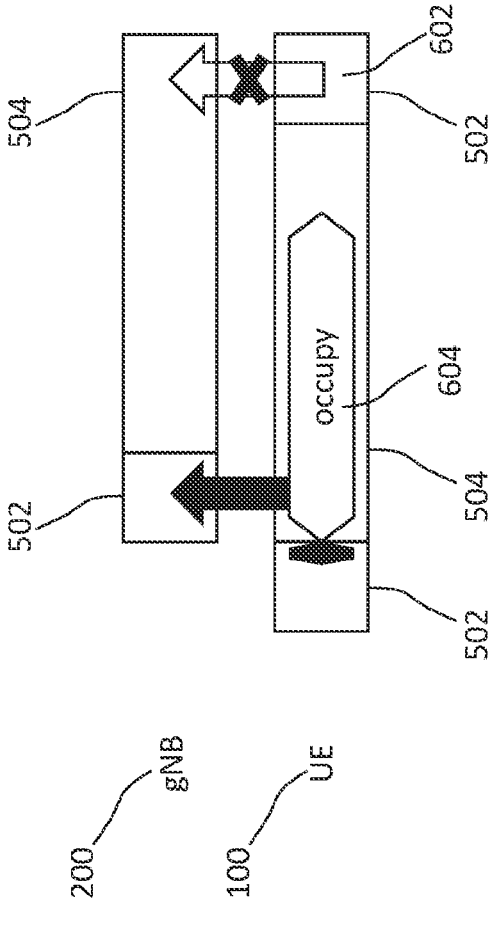

In a fifth variant (e.g., of the first embodiment), e.g. as illustrated in FIG. 9, if the UE 100 initiates a COT according to its own FFP cycle (i.e., the first FFP 500), the UE 100 may transmit 304 during the gNB's idle period 502 (i.e. the IT of the second FFP 500).

In a sixth variant (e.g., of the first embodiment), e.g. as illustrated in FIG. 10, the UE 100 is expected to continue to monitor for DL transmissions from its own serving gNB 200 during the UE's idle period 502, nonetheless, if any of the transmissions (e.g., the second message of the gNB 200) requires corresponding UL transmission as part of UE's initiated COT (e.g. PUSCH in response to grant, HARQ feedback in response to PDSCH, etc.). Furthermore, the UE 100 is not expected to perform the transmission if the timing of the transmission falls within the UE's idle period 502 (i.e., the IT 502 of the first FFP 500).

In a seventh variant (e.g., of the first embodiment), e.g. as illustrated in FIG. 11, DL transmissions as part of a UE's initiated COT or M-COT 504 may still be performed during the gNB's idle period 502 (i.e., the IT 502 of the second FFP).

Similarly, in an eight variant (e.g., of the first embodiment), e.g. as illustrated in FIG. 12, UL transmissions as part of the gNB's initiated COT or M-COT 502 may still pe performed during the UE's idle period (i.e., the IT 502 of the first FFP).

A second embodiment (e.g., as illustrated in any one of the FIGS. 13A to 13C and/or 14A to 14C), which may be combined with the first embodiment, relates to a DL preconfigured radio resource (labeled as a "preconfigured message" or "Prec. Msg."). The preconfigured radio resource may be preconfigured by SPS and/or may be a reference signals, or other periodic DL signals that the UE 100 could otherwise receive.

The preconfigured radio resource may require response, e.g. feedback could be any type of response message for an initial message. The preconfigured radio resource may comprise a data transmission, a paging request, a random access channel (RACH) preamble, etc.

Figures 13A, 13B, 13C:
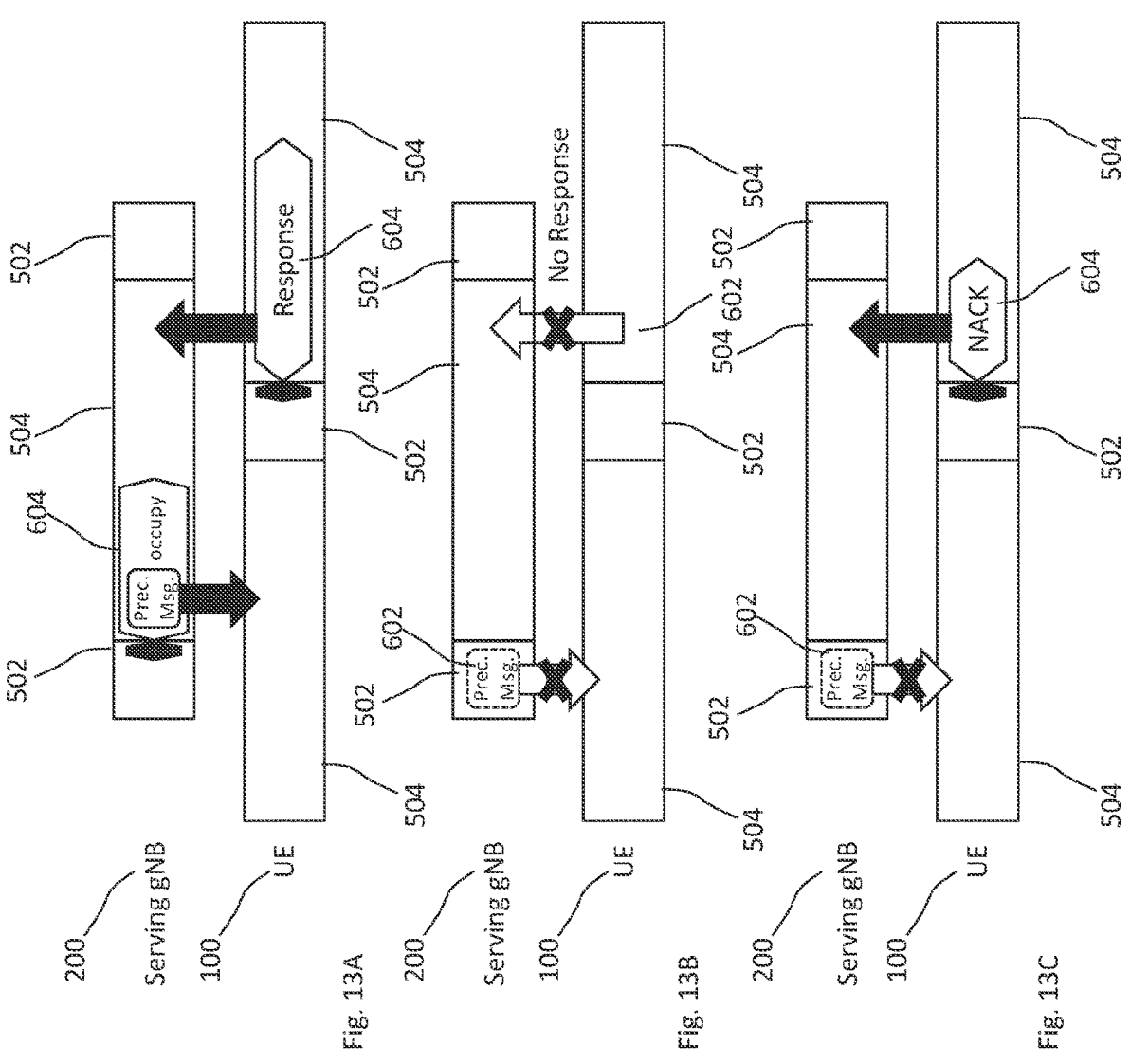

In the case illustrated in FIG. 13A, the preconfigured radio resource is in the M-COT 504 of the second FFP 500, so that the UE 100 receives and transmits the response associated to the preconfigured radio resource in the M-COT 504 of the first FFP 500.

If the preconfigured radio resource occurs in the gNB's idle period 502, as depicted in FIG. 13A or 13B, the UE 100 may act according to any one of the following options.

According to a first option, the UE 100 is not expected to provide the response (e.g., a HARQ feedback in response to the SPS occasion) that falls in the gNB's idle period (i.e., the IT 502 of the second FFP). As a non-limiting example, no placeholder or bits are allocated in the HARQ codebook, for instance in Type-2 codebook. This saves radio resources. It means that no physical uplink control channel (PUCCH) is transmitted during the Idle period 502. An example of the first option is illustrated in FIG. 13B.

According to a second option, the UE reports a NACK as the response, e.g., corresponding to the SPS occasion that falls in the gNB's idle period 502 (i.e., the IT 502 of the second FFP). An example of the second option is illustrated in FIG. 13B.

According to a third or general option, the UE is not expected to transmit a "response" to any preconfigured (or dynamic) command and/or transmission occasion that falls in the gNB's idle period (i.e., the IT 502 of the second FFP).

For example, beside HARQ-feedback (a type of response message), there could be Paging response message to the initial occurred Paging request occasion (falling in the idle period), and thus the node is not expected to send/transmit Paging response.

Another example of response message could be CSI feedback, etc.

Figures 14A, 14B, 14C:
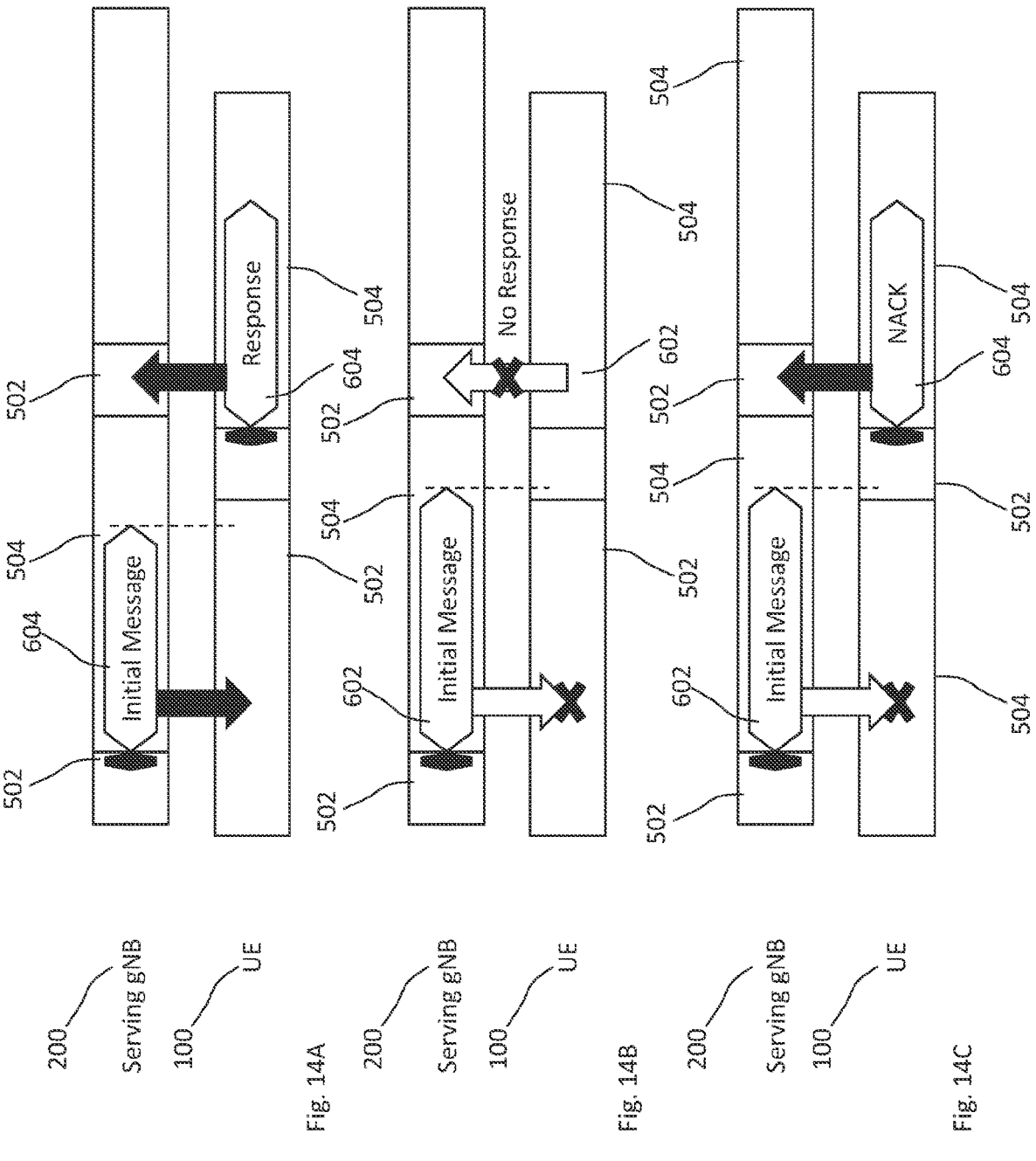

FIGS. 14A, 14B and 14C illustrate a variant of the second embodiment and/or a variant of the examples illustrated in FIGS. 13A, 13B and 13C, respectively.

In a third embodiment (e.g., as illustrated in any one of the FIGS. 15A and 15B), which may be combined with the first and/or second embodiment, the UE 100 does not monitor any PDCCH transmission on the idle period 502. In a variant, e.g., as illustrated in FIG. 15B, the UE 100 does not monitor any PDCCH transmission or does not attempt to detect PDSCH, which supposedly starts in the M-COT 504 (i.e., a non-idle period) and ends in the IT 502 (i.e., the idle period).

While FIGS. 15A and 15B illustrate synchronized first and second FFPs 500, the third embodiment may also be implemented if the UE 100 has its own FFP cycle that is not synchronized with FFP cycle of gNB.

A fourth embodiment, which may be combined with any one of the first, second or third embodiments, relates to a group of PDSCHs are colliding. A resolution among the colliding PDSCHs may comprise (e.g., prior to a final resolution or as a preselection prior to the resolution) at least one of the following option.

A first option discards the PDSCHs occurring over the IT 502 and/or over prohibited symbols (e.g., over UL symbols or symbols reserved important DL control information), optionally irrespective of their priority and/or an SPS ID or dynamic scheduling.

A second option, which may be performed subsequent to the first option, comprises defining one or more PDSCHs that are resolute (e.g., that are maintained):

a. If all PDSCH are based on SPS, then PDSCHs are resolute based on lowest SPS ID.

For example, in the group, first we check the possible valid lowest SPS ID #X based PDSCH and discard any PDSCH that is colliding/overlapping with it. Then, next we check for $2^{nd}$ best lowest SPS ID #Y PDSCH (where Y>X), and repeat the same algorithm until all the collisions are resolute in the group.

b. If there are N PDSCHs which are based on SPS and one PDSCH is dynamically allocated, then dynamic PDSCH would be treated as a PDSCH with a lowest fictional SPS ID (e.g., if the lowest SPS ID is X for an SPS based PDSCH, then dynamic PDSCH can be considered with fictional SPS ID of X−1), and use the same principle of a. of the second option.

This means valid dynamic PDSCH always have the precedence.

c. If there are N PDSCHs which are SPS based and M PDSCHs is dynamically allocated where N≥0 and M≥0, then PDSCHs are resolute based on the highest priority (which can be based on PHY layer). For example, in the group, first we check the possible valid highest priority PDSCH (can be SPS or dynamic based) and discard any PDSCH that is colliding/overlapping with it. Then, next we check for $2^{nd}$ best priority PDSCH and repeat the same algorithm until all the collisions are resolute in the group.

A fifth embodiment relates to radio resources of an UL configured grant (CG) occasions falling entirely or partly into the IT 502. The UE 100 refrains from any transmissions in such UL CG occasions, e.g., meaning that no MAC packet data unit (PDU) is created for transmission. This can be achieved by at least one of the following options.

According to a first option, the configured grant (CG) operation is temporarily suspended during the IT 502. This can be considered as a bandwidth part deactivation from MAC point of view. Configured grant operation may be resumed when the IT 502 is over, optionally which may be implemented as bandwidth part reactivation from MAC point of view. While transmissions are suspended, the UE processing of time until the next configured grant occasion is not suspended, i.e. when calculating the period between configured grant occasions, the IT 502 is accounted for.

According to a second option, when the UE 100 is configured with Idle periods 502, configured grant occasions falling in these Idle periods 502 are pre-calculated from the UE 100 and proactively not considered as configured grant occasions.

While above description referred to CG occasions, the same may be implemented or applies to SPS occasions.

In a sixth or generic embodiment, which may be combined with any one of the first to fifth embodiment, relates or applies to a set of radio resource 602 (e.g., a transmission resource), referred to as Resource #A, which occurs (e.g., partly or completely) in the IT 502.

If the Resource #A is configured as a DL radio resource, UE 100 refrains from monitoring, e.g., is not expected to (or does not) monitor (or do decoding attempts) on Resource #A.

Alternatively or in addition, an additional or separate set of radio resources, which is referred to as Resource #B is allocated (e.g., to the UE 100) and is dependent on the transmission at Resource #A. The Resource #B may be on a valid or non-idle period 504. The node (e.g., gNB 200 or UE 100) is refrains from transmitting and/or refrains from monitoring (e.g., is not expected to transmit and/or receive and/or monitor) a transmission on the Resource #B.

For example, the Resource #B may be configured for a HARQ feedback (e.g., an UL HARQ-ACK feedback) in response to a DL transmission on the Resource #A.

Alternatively or in addition, if the set 602 of radio resources, i.e., the Resource #A is configured as an UL radio resource, the UE 100 refrains from transmitting (i.e., does not transmit) on the Resource #A. The Resource #A may partially or fully overlap with the IT 502.

Moreover, if an additional or separate set of radio resource (referred to as Resource #B, which can be on valid or non-idle period 502) is allocated and is dependent on the transmission at Resource #A, then the node (e.g., gNB 200 or UE 100) refrains from transmitting (i.e., is not expected to transmit/receive/monitor the transmission) on the Resource #B. E.g., the Resource #B may be configured for DL HARQ-ACK feedback for the UL transmission on Resource #A.

In any embodiment, the set of radio resources Resource #A and/or Resource #B may be configured with any mode, e.g., shared channel and/or control channel (in any order).

Figure 16:
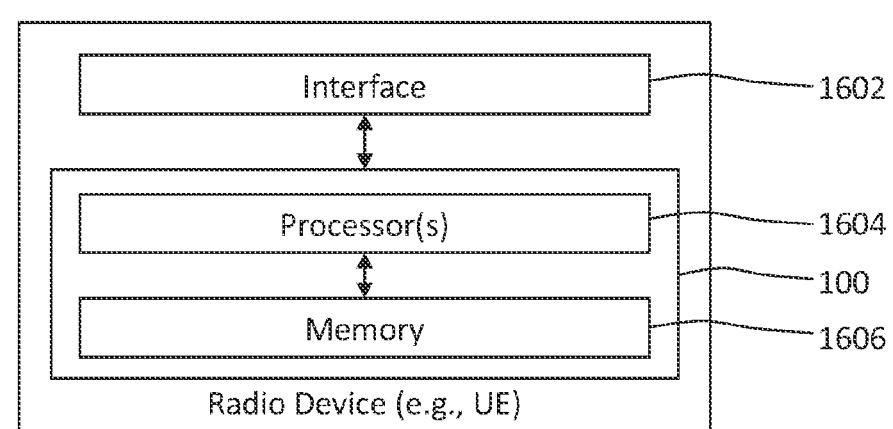
FIG. 16 shows a schematic block diagram of a radio device embodying the device of FIG. 1.

FIG. 16 shows a schematic block diagram for an embodiment of the device 100. The device 100 comprises processing circuitry, e.g., one or more processors 1604 for performing the method 300 and memory 1606 coupled to the processors 1604. For example, the memory 1606 may be encoded with instructions that implement at least one of the modules 102 and 104.

The one or more processors 1604 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1606, radio device functionality. For example, the one or more processors 1604 may execute instructions stored in the memory 1606. Such functionality may include providing various features and steps discussed herein, including any of the benefits disclosed herein. The expression "the device being operative to perform an action" may denote the device 100 being configured to perform the action.

As schematically illustrated in FIG. 16, the device 100 may be embodied by a radio device 1600, e.g., functioning as a UE. The UE 1600 comprises a radio interface 1602 coupled to the device 100 for radio communication with one or more base stations, e.g., functioning as a gNB.

Figure 17:
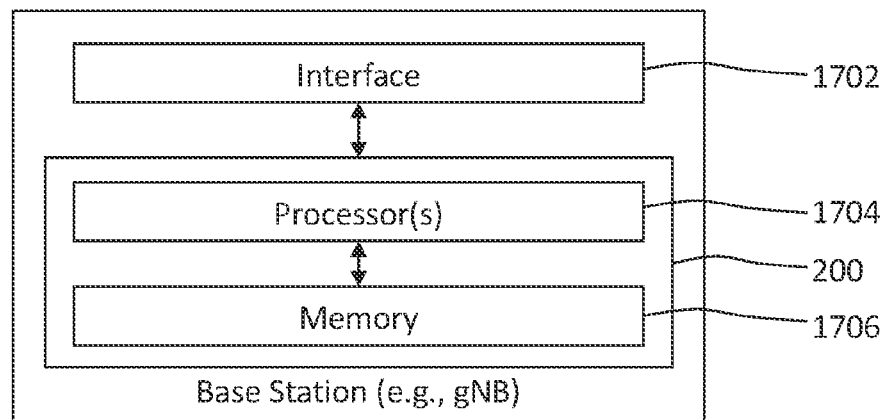
FIG. 17 shows a schematic block diagram of a base station embodying the device of FIG. 2.

FIG. 17 shows a schematic block diagram for an embodiment of the device 200. The device 200 comprises processing circuitry, e.g., one or more processors 1704 for performing the method 400 and memory 1706 coupled to the processors 1704. For example, the memory 1706 may be encoded with instructions that implement at least one of the modules 202 and 204.

The one or more processors 1704 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1706, base station functionality. For example, the one or more processors 1704 may execute instructions stored in the memory 1706. Such functionality may include providing various features and steps discussed herein, including any of the benefits disclosed herein. The expression "the device being operative to perform an action" may denote the device 200 being configured to perform the action.

As schematically illustrated in FIG. 17, the device 200 may be embodied by a base station 1700, e.g., functioning as a gNB. The base station 1700 comprises a radio interface 1702 coupled to the device 200 for radio communication with one or more radio device, e.g., functioning as UEs.

Figure 18:
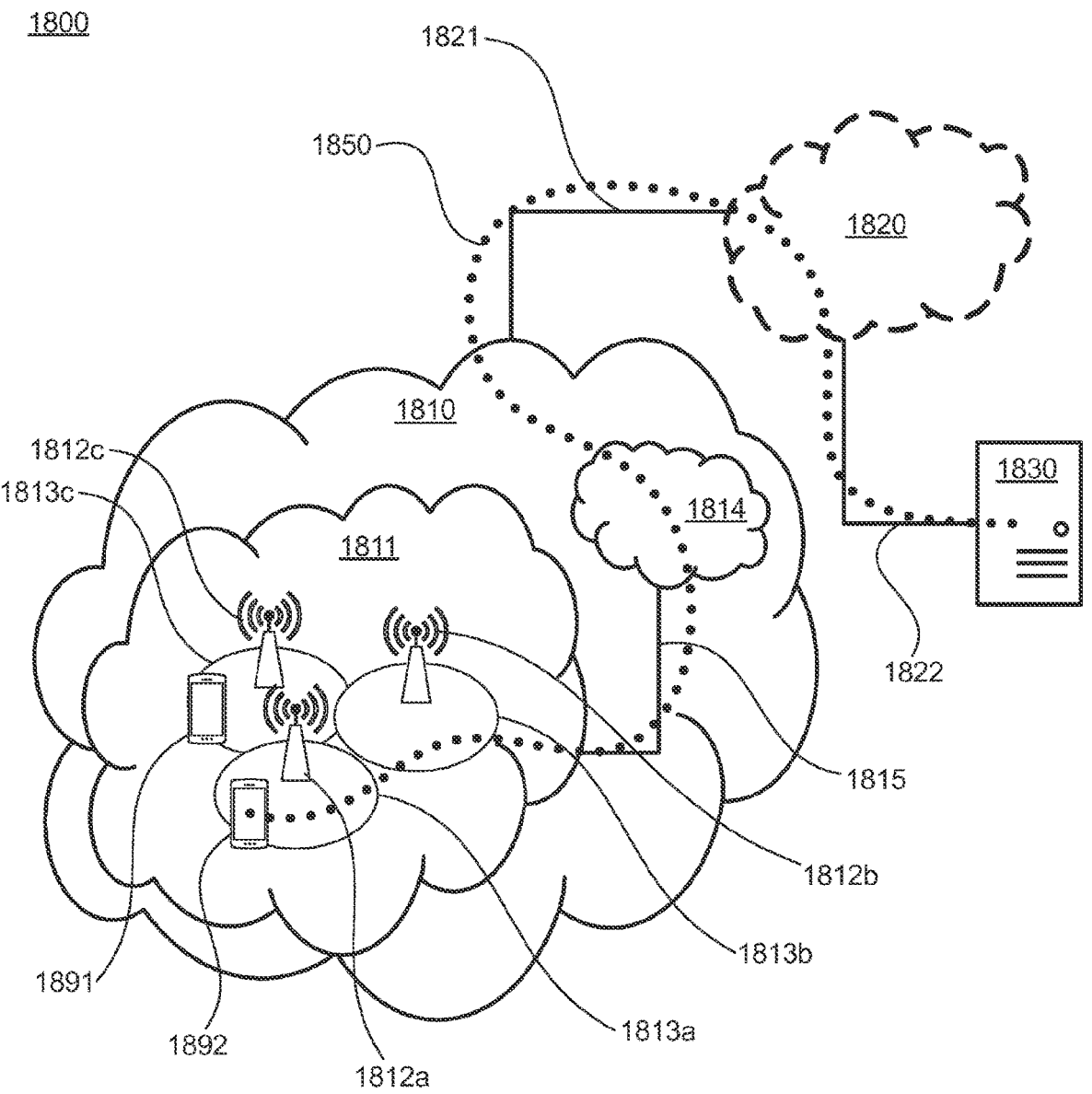
FIG. 18 schematically illustrates an example telecommunication network connected via an intermediate network to a host computer.

With reference to FIG. 18, in accordance with an embodiment, a communication system 1800 includes a telecommunication network 1810, such as a 3GPP-type cellular network, which comprises an access network 1811, such as a radio access network, and a core network 1814. The access network 1811 comprises a plurality of base stations 1812*a*, 1812*b*, 1812*c*, such as NBs, eNBs, gNBs or other types of wireless access points, each defining a corresponding coverage area 1813*a*, 1813*b*, 1813*c*. Each base station 1812*a*, 1812*b*, 1812*c* is connectable to the core network 1814 over a wired or wireless connection 1815. A first user equipment (UE) 1891 located in coverage area 1813*c* is configured to wirelessly connect to, or be paged by, the corresponding base station 1812*c*. A second UE 1892 in coverage area 1813*a* is wirelessly connectable to the corresponding base station 1812*a*. While a plurality of UEs 1891, 1892 are illustrated in this example, the disclosed embodiments are equally applicable to a situation where a sole UE is in the coverage area or where a sole UE is connecting to the corresponding base station 1812.

Any of the base stations 1812 and the UEs 1891, 1892 may embody the device 100.

The telecommunication network 1810 is itself connected to a host computer 1830, which may be embodied in the hardware and/or software of a standalone server, a cloud-implemented server, a distributed server or as processing resources in a server farm. The host computer 1830 may be under the ownership or control of a service provider, or may be operated by the service provider or on behalf of the service provider. The connections 1821, 1822 between the telecommunication network 1810 and the host computer 1830 may extend directly from the core network 1814 to the host computer 1830 or may go via an optional intermediate network 1820. The intermediate network 1820 may be one of, or a combination of more than one of, a public, private or hosted network; the intermediate network 1820, if any, may be a backbone network or the Internet; in particular, the intermediate network 1820 may comprise two or more sub-networks (not shown).

The communication system 1800 of FIG. 18 as a whole enables connectivity between one of the connected UEs 1891, 1892 and the host computer 1830. The connectivity may be described as an over-the-top (OTT) connection 1850. The host computer 1830 and the connected UEs 1891, 1892 are configured to communicate data and/or signaling via the OTT connection 1850, using the access network 1811, the core network 1814, any intermediate network 1820 and possible further infrastructure (not shown) as intermediaries. The OTT connection 1850 may be transparent in the sense that the participating communication devices through which the OTT connection 1850 passes are unaware of routing of uplink and downlink communications. For example, a base station 1812 need not be informed about the past routing of an incoming downlink communication with data originating from a host computer 1830 to be forwarded (e.g., handed over) to a connected UE 1891. Similarly, the base station 1812 need not be aware of the future routing of an outgoing uplink communication originating from the UE 1891 towards the host computer 1830.

By virtue of the method 200 being performed by any one of the UEs 1891 or 1892 and/or any one of the base stations 1812, the performance or range of the OTT connection 1850 can be improved, e.g., in terms of increased throughput and/or reduced latency. More specifically, the host computer 1830 may indicate to the base station 200 or the radio device 100 (e.g., on an application layer) scheme for scheduling the user data in the shared spectrum.

Example implementations, in accordance with an embodiment of the UE, base station and host computer discussed in the preceding paragraphs, will now be described with reference to FIG. 19. In a communication system 1900, a host computer 1910 comprises hardware 1915 including a communication interface 1916 configured to set up and maintain a wired or wireless connection with an interface of a different communication device of the communication system 1900. The host computer 1910 further comprises processing circuitry 1918, which may have storage and/or processing capabilities. In particular, the processing circuitry 1918 may comprise one or more programmable processors, application-specific integrated circuits, field programmable gate arrays or combinations of these (not shown) adapted to execute instructions. The host computer 1910 further comprises software 1911, which is stored in or accessible by the host computer 1910 and executable by the processing circuitry 1918. The software 1911 includes a host application 1912. The host application 1912 may be operable to provide a service to a remote user, such as a UE 1930 connecting via an OTT connection 1950 terminating at the UE 1930 and the host computer 1910. In providing the service to the remote user, the host application 1912 may provide user data, which is transmitted using the OTT connection 1950. The user data may depend on the location of the UE 1930. The user data may comprise auxiliary information or precision advertisements (also: ads) delivered to the UE 1930. The location may be reported by the UE 1930 to the host computer, e.g., using the OTT connection 1950, and/or by the base station 1920, e.g., using a connection 1960.

The communication system 1900 further includes a base station 1920 provided in a telecommunication system and comprising hardware 1925 enabling it to communicate with the host computer 1910 and with the UE 1930. The hardware 1925 may include a communication interface 1926 for setting up and maintaining a wired or wireless connection with an interface of a different communication device of the communication system 1900, as well as a radio interface 1927 for setting up and maintaining at least a wireless connection 1970 with a UE 1930 located in a coverage area (not shown in FIG. 19) served by the base station 1920. The communication interface 1926 may be configured to facilitate a connection 1960 to the host computer 1910. The connection 1960 may be direct, or it may pass through a core network (not shown in FIG. 19) of the telecommunication system and/or through one or more intermediate networks outside the telecommunication system. In the embodiment shown, the hardware 1925 of the base station 1920 further includes processing circuitry 1928, which may comprise one or more programmable processors, application-specific integrated circuits, field programmable gate arrays or combinations of these (not shown) adapted to execute instructions. The base station 1920 further has software 1921 stored internally or accessible via an external connection.

The communication system 1900 further includes the UE 1930 already referred to. Its hardware 1935 may include a radio interface 1937 configured to set up and maintain a wireless connection 1970 with a base station serving a coverage area in which the UE 1930 is currently located. The hardware 1935 of the UE 1930 further includes processing circuitry 1938, which may comprise one or more programmable processors, application-specific integrated circuits, field programmable gate arrays or combinations of these (not shown) adapted to execute instructions. The UE 1930 further comprises software 1931, which is stored in or accessible by the UE 1930 and executable by the processing circuitry 1938. The software 1931 includes a client application 1932. The client application 1932 may be operable to provide a service to a human or non-human user via the UE 1930, with the support of the host computer 1910. In the host computer 1910, an executing host application 1912 may communicate with the executing client application 1932 via the OTT connection 1950 terminating at the UE 1930 and the host computer 1910. In providing the service to the user, the client application 1932 may receive request data from the host application 1912 and provide user data in response to the request data. The OTT connection 1950 may transfer both the request data and the user data. The client application 1932 may interact with the user to generate the user data that it provides.

Figure 19:
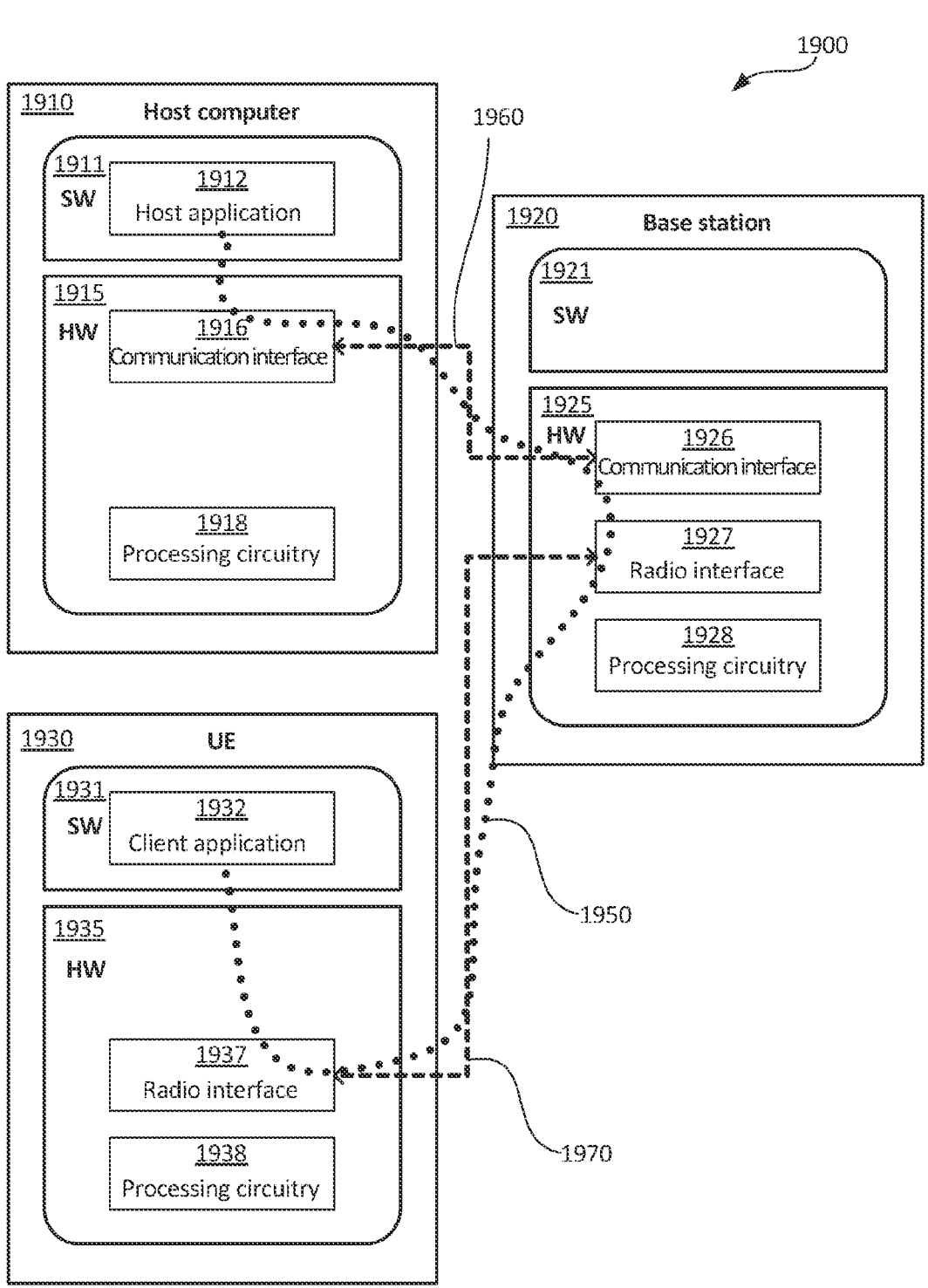
FIG. 19 shows a generalized block diagram of a host computer communicating via a base station or radio device functioning as a gateway with a user equipment over a partially wireless connection.

It is noted that the host computer 1910, base station 1920 and UE 1930 illustrated in FIG. 19 may be identical to the host computer 1830, one of the base stations 1812a, 1812b, 1812c and one of the UEs 1891, 1892 of FIG. 18, respectively. This is to say, the inner workings of these entities may be as shown in FIG. 19, and, independently, the surrounding network topology may be that of FIG. 18.

In FIG. 19, the OTT connection 1950 has been drawn abstractly to illustrate the communication between the host computer 1910 and the UE 1930 via the base station 1920, without explicit reference to any intermediary devices and the precise routing of messages via these devices. Network infrastructure may determine the routing, which it may be configured to hide from the UE 1930 or from the service provider operating the host computer 1910, or both. While the OTT connection 1950 is active, the network infrastructure may further take decisions by which it dynamically changes the routing (e.g., on the basis of load balancing consideration or reconfiguration of the network).

The wireless connection 1970 between the UE 1930 and the base station 1920 is in accordance with the teachings of the embodiments described throughout this disclosure. One or more of the various embodiments improve the performance of OTT services provided to the UE 1930 using the OTT connection 1950, in which the wireless connection 1970 forms the last segment. More precisely, the teachings of these embodiments may reduce the latency and improve the data rate and thereby provide benefits such as better responsiveness and improved QoS.

A measurement procedure may be provided for the purpose of monitoring data rate, latency, QoS and other factors on which the one or more embodiments improve. There may further be an optional network functionality for reconfiguring the OTT connection 1950 between the host computer 1910 and UE 1930, in response to variations in the measurement results. The measurement procedure and/or the network functionality for reconfiguring the OTT connection 1950 may be implemented in the software 1911 of the host computer 1910 or in the software 1931 of the UE 1930, or both. In embodiments, sensors (not shown) may be deployed in or in association with communication devices through which the OTT connection 1950 passes; the sensors may participate in the measurement procedure by supplying values of the monitored quantities exemplified above, or supplying values of other physical quantities from which software 1911, 1931 may compute or estimate the monitored quantities. The reconfiguring of the OTT connection 1950 may include message format, retransmission settings, preferred routing etc.; the reconfiguring need not affect the base station 1920, and it may be unknown or imperceptible to the base station 1920. Such procedures and functionalities may be known and practiced in the art. In certain embodiments, measurements may involve proprietary UE signaling facilitating the host computer's 1910 measurements of throughput, propagation times, latency and the like. The measurements may be implemented in that the software 1911, 1931 causes messages to be transmitted, in particular empty or "dummy" messages, using the OTT connection 1950 while it monitors propagation times, errors etc.

Figures 20, 21:
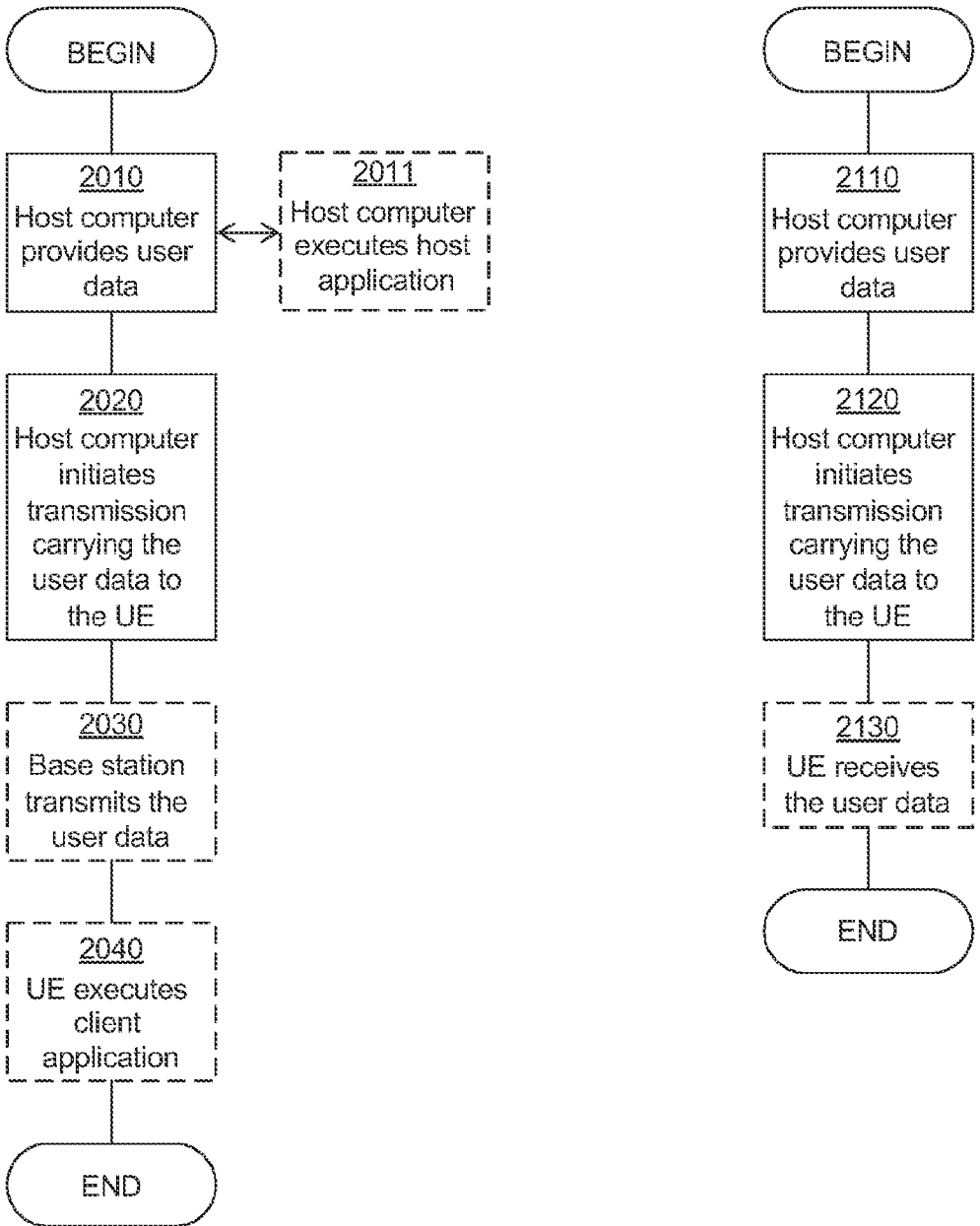
FIGS. 20 and 21 show flowcharts for methods implemented in a communication system including a host computer, a base station or radio device functioning as a gateway and a user equipment.

FIG. 20 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 20 will be included in this paragraph. In a first step 2010 of the method, the host computer provides user data. In an optional substep 2011 of the first step 2010, the host computer provides the user data by executing a host application. In a second step 2020, the host computer initiates a transmission carrying the user data to the UE. In an optional third step 2030, the base station transmits to the UE the user data which was carried in the transmission that the host computer initiated, in accordance with the teachings of the embodiments described throughout this disclosure. In an optional fourth step 2040, the UE executes a client application associated with the host application executed by the host computer.

FIG. 21 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 21 will be included in this paragraph. In a first step 2110 of the method, the host computer provides user data. In an optional substep (not shown) the host computer provides the user data by executing a host application. In a second step 2120, the host computer initiates a transmission carrying the user data to the UE. The transmission may pass via the base station, in accordance with the teachings of the embodiments described throughout this disclosure. In an optional third step 2130, the UE receives the user data carried in the transmission.

As has become apparent from above description, at least some embodiments of the technique allow for saving processing power in the radio device (e.g., UE).

Herein, any teachings as to a node (e.g., the radio device or the base station) "refraining from" a certain action may be implemented by the node "not performing" the action and/or the node being "not required to perform" the action and/or the node being not expected to perform the action.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of using radio resources in fixed frame periods (FFPs) on a channel for radio communication in a radio network comprising a first node and a second node, each of the FFPs comprising an idle time (IT) for clear channel assessment (CCA) of the channel and a maximum channel occupancy time (M-COT) for occupying the channel depending on the CCA, the method performed by the first node comprising or initiating at least one of the steps of:

selectively monitoring the radio resources in the FFPs on the channel, wherein the selective monitoring comprises refraining from monitoring a first set of the radio resources, which is allocated to a first message of the second node and which is partially or completely in the IT; and selectively transmitting on the radio resources in the FFPs on the channel, wherein the selective transmitting comprises refraining from transmitting on a first set of the radio resources, which is allocated to a first message of the first node and which is partially or completely in the IT.

2. The method of claim 1, wherein the refraining from monitoring the first set of the radio resources comprises refraining from decoding or refraining from attempting to decode the first message of the second node.

3. The method of claim 1, wherein the selective monitoring further comprises monitoring a second set of the radio resources, which is allocated to a second message of the second node and which is completely in the M-COT.

4. The method of claim 1, wherein the channel is occupied by the second node for transmitting the second message on the second set of radio resources during a channel occupancy time (COT) within the M-COT subsequent to the CCA indicating clearance of the channel.

5. The method of claim 1, wherein the FFPs comprise at least one first FFP used by the first node and at least one second FFP used by the second node.

6. The method of claim 1, wherein the first node and the second node use the same or synchronized FFPs.

7. The method of claim 1, wherein the FFPs are assigned to the first node by the second node.

8. The method of claim 1, further comprising or initiating:
performing the CCA by the first node.

9. The method of claim 1, wherein the first node is a radio device and the second node is a base station providing radio access to the radio device, or wherein the first node is a base station providing radio access to a radio device and the second node is the radio device.

10. The method of claim 9, wherein the radio network comprises a radio access network (RAN) wherein the RAN comprises the base station, and wherein the radio device is configured for radio access to the RAN.

11. The method of claim 1, wherein the first node is a first radio device and the second node is a second radio device providing radio access to the first radio device.

12. A first node for using radio resources in fixed frame periods (FFPs) on a channel for radio communication in a radio network comprising the first node and a second node, each of the FFPs comprising an idle time (IT) for clear channel assessment (CCA) of the channel and a maximum channel occupancy time (M-COT) for occupying the channel depending on the CCA, the first node comprising memory operable to store instructions and processing circuitry operable to execute the instructions, such that the first node is operable to at least one of:

selectively monitor the radio resources in the FFPs on the channel, wherein the selective monitoring comprises refraining from monitoring a first set of the radio resources, which is allocated to a first message of the second node and which is partially or completely in the IT; and selectively transmit on the radio resources in the FFPs on the channel, wherein the selective transmitting comprises refraining from transmitting on a first set of the radio resources, which is allocated to a first message of the first node and which is partially or completely in the IT.

13. The first node of claim 12, wherein the refraining from monitoring the first set of the radio resources comprises refraining from decoding or refraining from attempting to decode the first message of the second node.

14. The first node of claim 12, wherein the selective monitoring further comprises monitoring a second set of the radio resources, which is allocated to a second message of the second node and which is completely in the M-COT.

15. The first node of claim 12, wherein the channel is occupied by the second node for transmitting the second message on the second set of radio resources during a channel occupancy time (COT) within the M-COT subsequent to the CCA indicating clearance of the channel.

16. The first node of claim 12, wherein the FFPs comprise at least one first FFP used by the first node and at least one second FFP used by the second node.

17. The first node of claim 12, wherein the first node and the second node use the same or synchronized FFPs.

18. The first node of claim 12, wherein the FFPs are assigned to the first node by the second node.

19. The first node of claim 12, wherein the first node is operable to perform or initiate the CCA.

20. The first node of claim 12, wherein the first node is a radio device and the second node is a base station providing radio access to the radio device, or wherein the first node is a base station providing radio access to a radio device and the second node is the radio device.

21. The first node of claim 20, wherein the radio network comprises a radio access network (RAN) wherein the RAN comprises the base station, and wherein the radio device is configured for radio access to the RAN.

22. The first node of claim 12, wherein the first node is a first radio device and the second node is a second radio device providing radio access to the first radio device.

\* \* \* \* \*